United States Patent
Lee et al.

(10) Patent No.: US 10,914,983 B2
(45) Date of Patent: Feb. 9, 2021

(54) DISPLAY DEVICE

(71) Applicant: LG ELECTRONICS INC., Seoul (KR)

(72) Inventors: Kyungjoon Lee, Seoul (KR); Uihyung Lee, Seoul (KR); Juyoung Joung, Seoul (KR); Wondo Kee, Seoul (KR); Minho Kim, Seoul (KR); Wongjoon Hwang, Seoul (KR); Jaeyoon Jeong, Seoul (KR); Bohee Kang, Seoul (KR); Manhyuck Han, Seoul (KR); Jiu Myeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/904,351

(22) Filed: Jun. 17, 2020

(65) Prior Publication Data

US 2020/0319510 A1    Oct. 8, 2020

Related U.S. Application Data

(63) Continuation of application No. 14/932,412, filed on Nov. 4, 2015, now Pat. No. 10,698,256.

(30) Foreign Application Priority Data

Nov. 14, 2014    (KR) .................. 10-2014-0159155
Nov. 14, 2014    (KR) .................. 10-2014-0159166

(51) Int. Cl.
*G02F 1/13357*    (2006.01)
*F21V 7/00*    (2006.01)
(Continued)

(52) U.S. Cl.
CPC .. *G02F 1/133605* (2013.01); *G02F 1/133603* (2013.01); *G02F 1/133608* (2013.01);
(Continued)

(58) Field of Classification Search
CPC ......... G02F 1/133603; G02F 1/133605; G02F 1/133608; G02F 2001/133607; F21V 7/22; F21V 7/24; F21V 7/0058
See application file for complete search history.

(56) References Cited

U.S. PATENT DOCUMENTS

| 10,698,256 B2 | 6/2020 | Lee et al. |
| 2008/0002403 A1 | 1/2008 | Kim |

(Continued)

FOREIGN PATENT DOCUMENTS

| CN | 103548160 | 1/2014 |
| CN | 104820310 | 8/2015 |

OTHER PUBLICATIONS

U.S. Appl. No. 14/932,412, Office Action dated Dec. 1, 2017, 12 pages.
(Continued)

*Primary Examiner* — Zheng Song
(74) *Attorney, Agent, or Firm* — Lee, Hong, Degerman, Kang & Waimey PC

(57) ABSTRACT

Disclosed herein are a backlight unit and a display device using the same. In an embodiment, the backlight unit includes a substrate, at least one light source on the substrate, a lenses placed over the light source, a reflection sheet in which at least one through hole corresponding to the lens is formed, and a reflection ring comprising an opening portion corresponding to the at least one light source, and placed between the lens and the substrate. In accordance with an embodiment of the present invention, luminance uniformity of the backlight unit can be improved because the reflection ring surrounding the light source is included.

17 Claims, 43 Drawing Sheets

(51) Int. Cl.
*F21V 7/24* (2018.01)
*F21V 7/22* (2018.01)

(52) U.S. Cl.
CPC .............. *F21V 7/0058* (2013.01); *F21V 7/22* (2013.01); *F21V 7/24* (2018.02); *G02F 2001/133607* (2013.01)

(56) References Cited

U.S. PATENT DOCUMENTS

| | | |
|---|---|---|
| 2008/0219003 A1 | 9/2008 | Park |
| 2010/0182792 A1 | 7/2010 | Hsiao et al. |
| 2010/0220461 A1 | 9/2010 | Naijo |
| 2011/0261286 A1* | 10/2011 | Choi .................. G02F 1/133611 349/61 |
| 2012/0206673 A1 | 8/2012 | Ogata et al. |
| 2012/0327311 A1 | 12/2012 | Kuromizu et al. |
| 2013/0087822 A1* | 4/2013 | Kim ........................ H01L 33/54 257/98 |
| 2014/0092584 A1 | 4/2014 | Ono et al. |
| 2014/0218625 A1 | 8/2014 | Kuromizu |
| 2014/0321127 A1 | 10/2014 | Chang et al. |
| 2015/0109559 A1* | 4/2015 | Lee .................. G02F 1/133606 349/67 |
| 2015/0211715 A1* | 7/2015 | Song ..................... G02F 1/1336 362/97.3 |
| 2015/0219966 A1* | 8/2015 | Song ........................ F21V 7/04 362/97.3 |
| 2015/0221831 A1* | 8/2015 | Kim ........................ H01L 33/62 257/98 |
| 2015/0226400 A1 | 8/2015 | Wada et al. |
| 2015/0234234 A1 | 8/2015 | Lee et al. |
| 2015/0268513 A1* | 9/2015 | Chang ................ H01L 25/0753 362/97.1 |
| 2015/0323729 A1 | 11/2015 | Takatori et al. |
| 2015/0355399 A1* | 12/2015 | You ........................ G02B 6/005 349/65 |
| 2016/0061414 A1 | 3/2016 | Song et al. |

OTHER PUBLICATIONS

U.S. Appl. No. 14/932,412, Final Office Action dated Apr. 19, 2018, 13 pages.
U.S. Appl. No. 14/932,412, Office Action dated Sep. 7, 2018, 15 pages.
U.S. Appl. No. 14/932,412, Final Office Action dated Jan. 7, 2020, 13 pages.
U.S. Appl. No. 14/932,412, Notice of Allowance dated Mar. 4, 2020, 9 pages.
Chinese Office Action dated Apr. 32, 2018 issued in Application No. 201510781696.0 (with English Translation).
European Search Report issued in Application No. 15003205.0 dated Feb. 5, 2016.

* cited by examiner (a)

(b)

DISPLAY DEVICE

CROSS-REFERENCE TO RELATED APPLICATIONS

This application is a continuation of U.S. patent application Ser. No. 14/932,412, filed on Nov. 4, 2015, now U.S. Pat. No. 10,698,256, which claims the benefit of earlier filing date and right of priority to Korean Application Nos. 10-2014-0159155, filed on Nov. 14, 2014, and 10-2014-0159166, filed on Nov. 14, 2014, the contents of which are all incorporated by reference herein in their entirety.

BACKGROUND

1. Field

The present invention relates to a backlight unit and a display device using the same.

2. Background

As the information-oriented society is advanced, a demand for the display device is increased in various ways. In line with this trend, various display devices, such as a liquid crystal display device (LCD), a plasma display panel (PDP), an electroluminescent display (ELD), and a vacuum fluorescent display (VFD) are recently researched and used.

In particular, the liquid crystal panel of an LCD includes a liquid crystal layer and a TFT substrate and a color filter substrate disposed to face each other with the liquid crystal layer interposed therebetween. The liquid crystal panel may display an image using light provided by a backlight unit.

BRIEF DESCRIPTION OF THE DRAWINGS

The embodiments will be described in detail with reference to the following drawings in which like reference numerals refer to like elements wherein.

DETAILED DESCRIPTION

Figure 1:
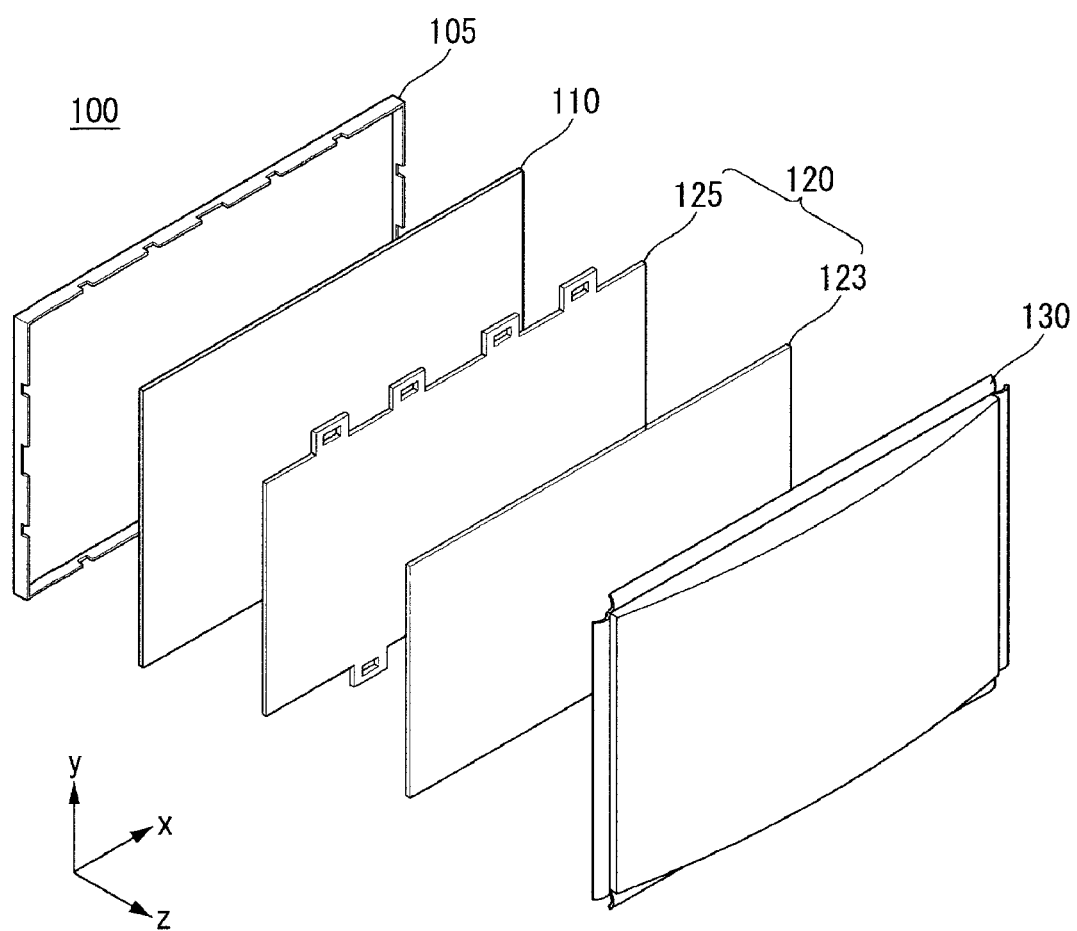
FIGS. 1 to 5 are diagrams showing a configuration of a display device related to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

FIGS. 1 to 5 are diagrams showing a configuration of a display device related to an embodiment of the present invention.

Referring to FIG. 1, the display device 100 in accordance with an embodiment of the present invention may include a front cover 105, a display panel 110, a backlight unit 120, and a back cover 130.

The front cover 105 may cover the top and sides of the display panel 110. The front cover 105 may be a rectangular frame shape having an empty center. An image of the display panel 110 may be displayed to the outside because the center of the front cover 105 is empty.

The display panel 110 is provided at the front side of the display device 100 and may display an image. The display panel 110 may divide an image into a plurality of pixels, may control the image so that each of the plurality of pixels emits light according to its color, brightness, and chroma, and may output the image. The display panel 110 may be divided into an active region in which an image is displayed and an inactive region in which an image is not displayed. The display panel 110 may include a front substrate and a rear substrate which face each other with a liquid crystal layer interposed therebetween.

The front substrate may include a plurality of pixels formed of red (R), green (G) and blue (B) sub-pixels. When light is applied, the front substrate may generate an image corresponding to red, green, or blue.

The rear substrate may include switching elements. The rear substrate may switch a pixel electrode. For example, the pixel electrode may change the arrangement of the molecules of the liquid crystal layer in response to an external voltage.

The liquid crystal layer may include a plurality of liquid crystal molecules. The liquid crystal molecules may change their arrangement in response to a voltage difference between the pixel electrode and a common electrode. The liquid crystal layer may transfer light provided by the backlight unit 120 to the front substrate.

The backlight unit 120 may be placed at the back side of the display panel 110. The backlight unit 120 may provide light from the back side of the display panel 110 to the display panel 110. A detailed structure of the backlight unit 120 is described later.

The backlight unit 120 may be closely attached to the back side of the display panel 110. For example, the backlight unit 120 may be attached and fixed to the back side of the display panel 110. In order to attach the backlight unit 120 to the display panel 110, an adhesive layer may be formed between the backlight unit 120 and the display panel 110.

The thickness of the display device 100 can be reduced because the display panel 110 and the backlight unit 120 are closely attached together. Furthermore, a fabrication process can be simplified because a structure for fixing the backlight unit 120 is not necessary. Furthermore, a malfunction of the display device attributable to the insertion of an alien substance into the space between the backlight unit 120 and the display panel 110 can be prevented because the space is reduced.

The back cover 130 may be placed at the back side of the backlight unit 120. The back cover 130 may protect the backlight unit 120 against the outside.

The back cover 130 may be combined with the front cover 105. The display panel 110 and the backlight unit 120 may be modulated by the back cover 130 and the front cover 105.

Figure 2:
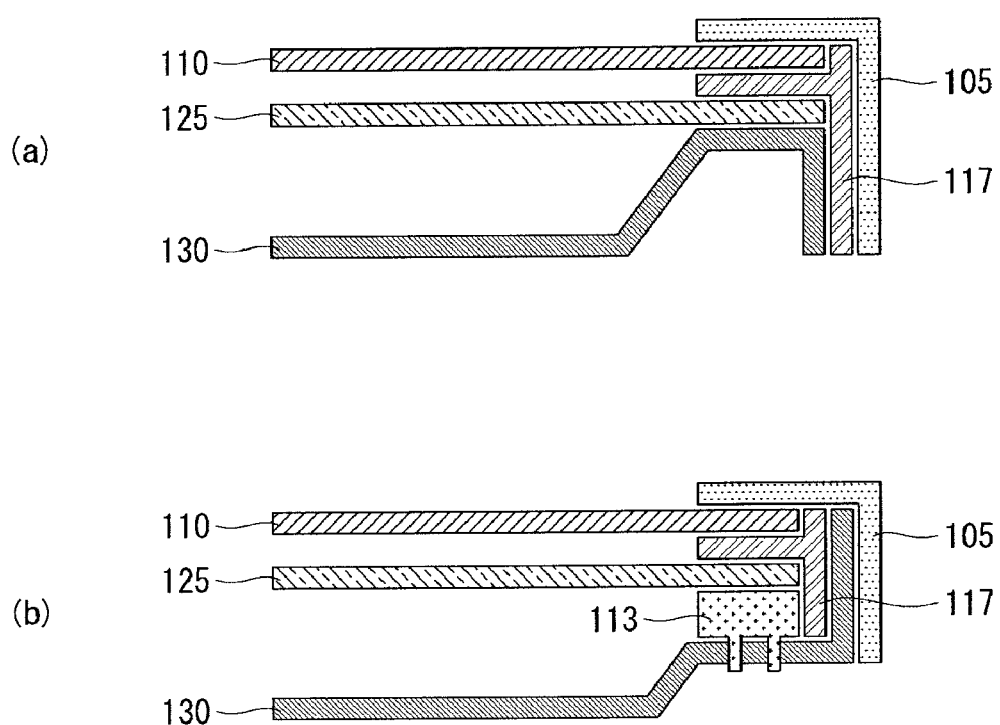

Referring to FIG. 2, an optical sheet 125 may be placed over the back cover 130. The optical sheet 125 may be combined with the back cover 130 at the edge of the back cover 130. The optical sheet 125 may be directly seated in the edge of the back cover 130. That is, the optical sheet 125 may be supported by the back cover 130. The top surface of the edge of the reflection sheet 125 may be surrounded by an upper guide panel 117. Specifically, the optical sheet 125 may be placed between the edge of the back cover 130 and the upper guide panel 117.

The display panel 110 may be placed over the optical sheet 125. The display panel 110 may be combined with the upper guide panel 117 at edges of the display device 100. The display panel 110 may be directly seated in the upper guide panel 117. That is, the display panel 110 may be supported by the upper guide panel 117. The sides of the display panel 110 may be guided by the upper guide panel 117. The top surface of the edge of the display panel 110 may be surrounded by the front cover 105. Specifically, the display panel 110 may be placed between the upper guide panel 117 and the front cover 105.

The display device in accordance with an embodiment of the present invention may further include a lower guide panel 113 between the back cover 130 and the optical sheet 125. In this case, the optical sheet 125 may be directly seated in the lower guide panel 113. That is, the optical sheet 125 may be supported by the lower guide panel 113.

Figure 3:
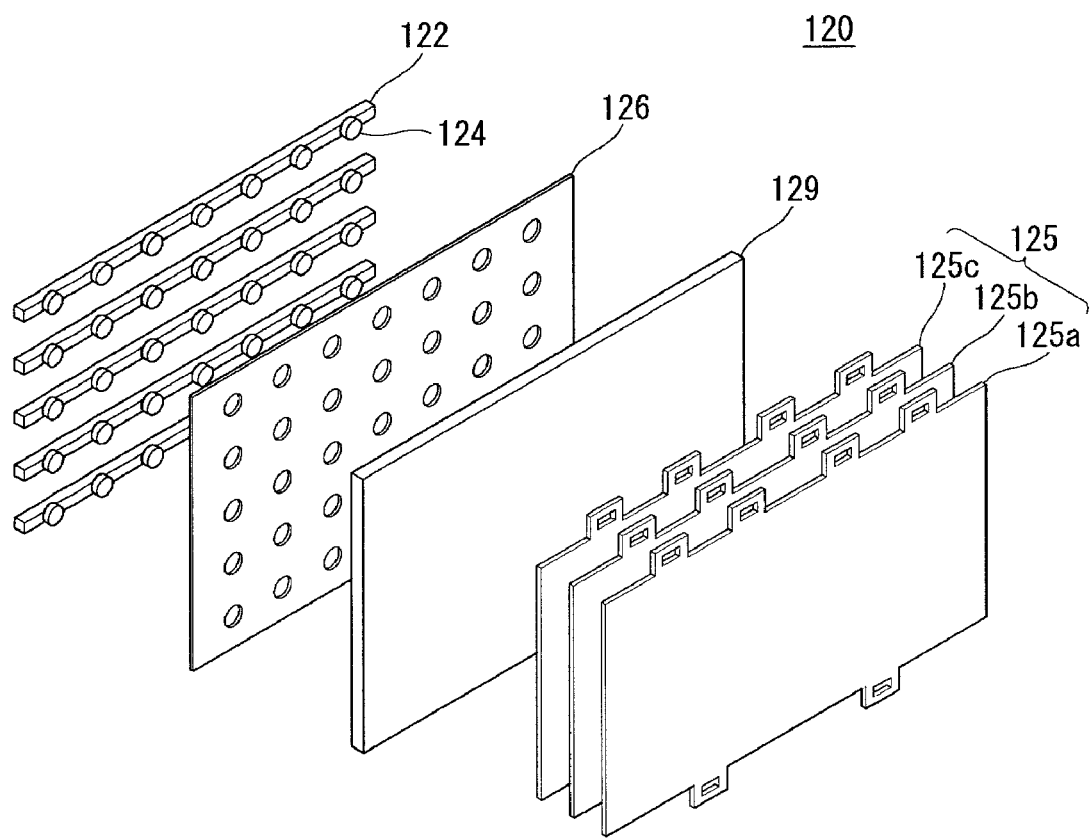
Figure 4:
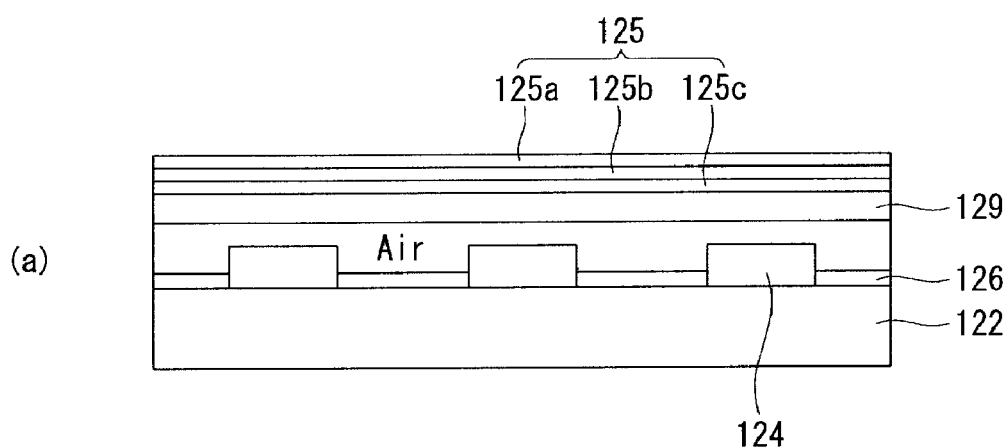
Figure 4:
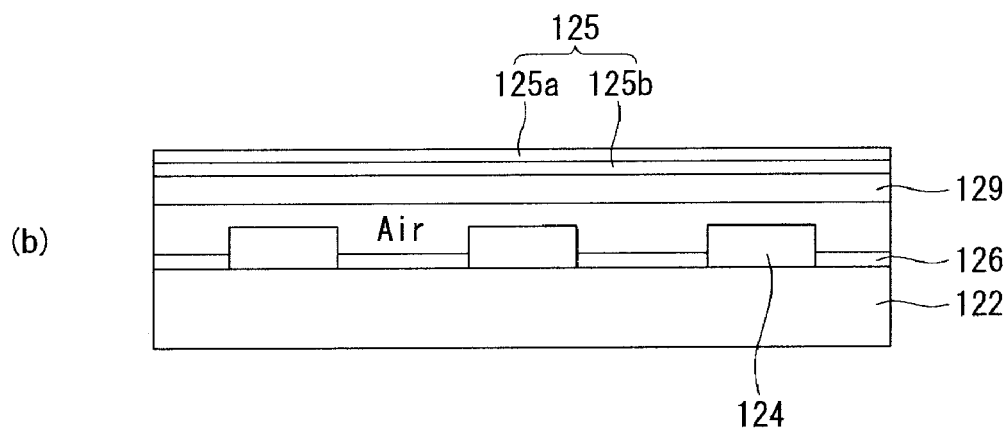

Referring to FIGS. 3 and 4, the backlight unit 120 may include a substrate 122, at least one light assembly 124, a reflection sheet 126, a diffusion plate 129, and the optical sheet 125.

The substrate 122 may include a plurality of bands configured to extend in a first direction and spaced apart from each other at a specific interval in a second direction orthogonal to the first direction. The substrate 122 may be a substrate on which the at least one light assembly 124 is mounted. An electrode pattern for connecting an adaptor and the light assembly 124 may be formed in the substrate 122. For example, a carbon nanotube electrode pattern for connecting the light assembly 124 and the adaptor may be formed in the substrate 122.

The substrate 122 may be made of polyethyleneterephthalate (PET), glass, polycarbonate (PC), or silicon. The substrate 122 may be a printed circuit board (PCB) substrate on which the at least one light assembly 124 is mounted.

The light assembly 124 having a specific interval in the first direction may be mounted on the substrate 122. The diameter of the light assembly 124 may be greater than the width of the substrate 122 in the second direction. The light assembly 124 may be any one of a light-emitting diode (LED) chip and an LED package including at least one LED chip.

The light assembly 124 may be a colored LED configured to emit at least one of colors, such as red, blue, and green, or may be formed of a white LED. The colored LED may include at least one of a red LED, a blue LED, and a green LED.

The reflection sheet 126 may be placed on the substrate 122. The reflection sheet 126 may be placed in a region other than a region in which the light assembly 124 of the substrate 122 has been formed. That is, the reflection sheet 126 may have a through hole in the region in which the light assembly 124 has been formed.

The reflection sheet 126 may reflect light emitted by the light assembly 124. Furthermore, the reflection sheet 126 may reflect light totally reflected by the diffusion plate 129. Accordingly, the reflection sheet 126 may diffuse light emitted by the light assembly 124.

The reflection sheet 126 may include at least one of reflection substances, such as metal and metal oxides. For example, the reflection sheet 126 may include metal or metal oxides having a high reflectance, such as one of aluminum (Al), silver (Ag), gold (Au), and titanium dioxide ($TiO_2$).

The reflection sheet 126 may be formed by depositing or coating metal or metal oxides on the substrate 122. The reflection sheet 126 may be formed by printing metal ink. The reflection sheet 126 may be deposited using a vacuum deposition method, such as a thermal deposition method, an evaporation method, or a sputtering method. The reflection sheet 126 may be coated or printed using a printing method, a gravure coating method, or a silk screen method.

Air gaps may be placed on the light assembly 124 and the reflection sheet 126. The air gap may function as a buffer for widely spreading light emitted by the light assembly 124. Resin may be deposited on the light assembly 124 and the reflection sheet 126. In this case, the resin may function to diffuse light emitted by the light assembly 124.

The diffusion plate 129 may be placed on the air gaps. The diffusion plate 129 may upward diffuse light emitted by the light assembly 124.

The optical sheet 125 may be placed on the diffusion plate 129. The optical sheet 125 may include at least one sheet. Specifically, the optical sheet 125 may include one or more prism sheets and/or one or more diffusion sheets.

The plurality of sheets included in the optical sheet 125 are not spaced apart from each other and are provided in the adhesion or closed state, thereby being capable of reducing the thickness of the optical sheet 125 or the backlight unit 120.

The lower side of the optical sheet 125 may be closely attached to the diffusion plate 129, and the upper side of the optical sheet 125 may be closely attached to the lower side of the display panel.

The diffusion sheet of the optical sheet 125 may make luminance of light more uniform by preventing light from the diffusion plate from being partially crowded. Furthermore, the prism sheet of the optical sheet 125 may focus light from the diffusion sheet so that the light is vertically incident on the display panel.

The optical sheet 125 may include a plurality of sheets having different functions. For example, the optical sheet 125 may include first to third optical sheets 125a to 125c. The first optical sheet 125a may have the function of the diffusion sheet, and the second and the third optical sheets 125b and 125c may have the function of the prism sheet.

In some embodiments, the optical sheet 125 may include the first and the second optical sheets 125a and 125b. The first optical sheet 125a may have the function of the diffusion sheet, and the second optical sheet 125b may have the function of the prism sheet.

The backlight unit 120 may be driven using a total driving method or a partial driving method, such as a local dimming or impulsive method, but is not limited thereto. A method of driving the backlight unit 120 may be changed in various ways depending on the circuit design. Accordingly, the display device in accordance with an embodiment of the present invention can sharply represent a dark portion and a bright portion in a screen, thereby being capable of improving picture quality.

Figure 5:
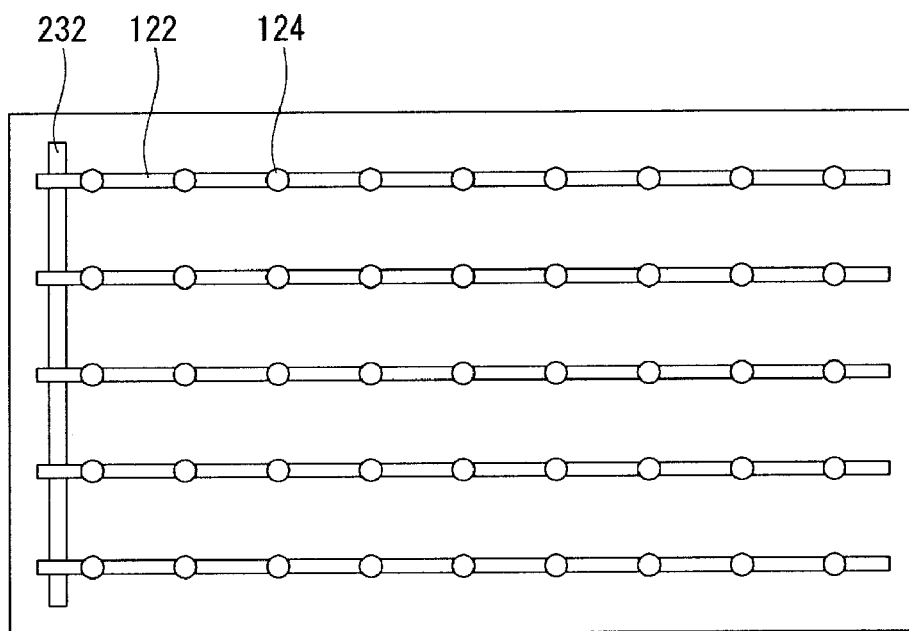

Referring to FIG. 5, the substrate 122 including a plurality of bands configured to extend in the first direction and spaced apart from each other at a specific interval in the second direction orthogonal to the first direction may be provided on the back cover. The ends of a plurality of the substrates 122 on one side thereof may be connected to a wiring electrode 232.

The wiring electrode 232 may extend in the second direction. The wiring electrode 232 may be connected to the end of the first layer 122 on one side thereof at a specific interval in the second direction. The wiring electrode 232 may electrically connect the substrate 122 and the adaptor.

The light assembly 124 may be mounted on the substrate 122 at a specific interval in the first direction. The diameter of the light assembly 124 may be greater than the width of the substrate 122 in the second direction. Accordingly, the outside region of the light assembly 124 may infringe a region in which the substrate 122 is not provided.

FIGS. 6 to 30 are detailed diagrams for illustrating the display device in accordance with an embodiment of the present invention.

Figure 6:
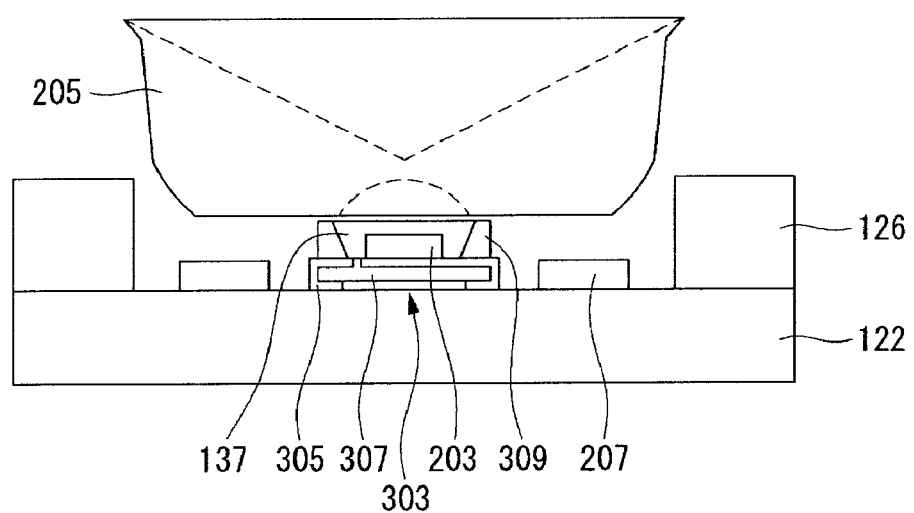
FIGS. 6 to 30 are detailed diagrams for illustrating a display device in accordance with an embodiment of the present invention.

Referring to FIG. 6, a light source package 303 may be placed on the substrate 122. The light source package 303 may be placed at the center of the light assembly 124, but is not limited thereto. In some embodiments, the light source package 303 may be placed in a portion other than the center of the light assembly 124.

The light source package 303 may include a light source 203, a lead frame 305, a package body 307, and reflection plates 309.

The package body 307 may be placed on the substrate 122. The lead frame 305 may surround the package body 307. The lead frame 305 may connect the light source 203 and the substrate 122 through a wire. Accordingly, a specific voltage from the substrate 122 may be transferred to the light source 203 through the wire.

The light source 203 may be placed on the lead frame 305. Specifically, the light source 203 may be mounted on the lead frame 305.

The reflection plates 309 may be placed on the lead frame 305. The reflection plates 309 may surround the sides of the light source 203. The reflection plates 309 may reflect light emitted from the sides of the light source 203, thereby being capable of improving light-emitting efficiency of the light source 203. The reflection plates 309 may control a tilt angle by taking into consideration the characteristic of light from the light source 203.

The light assembly 124 may be a package on board (POB) type light assembly 124. Specifically, the light assembly 124 may be the light assembly 124 in which a package on which a chip has been mounted is mounted on a substrate.

Figure 7:
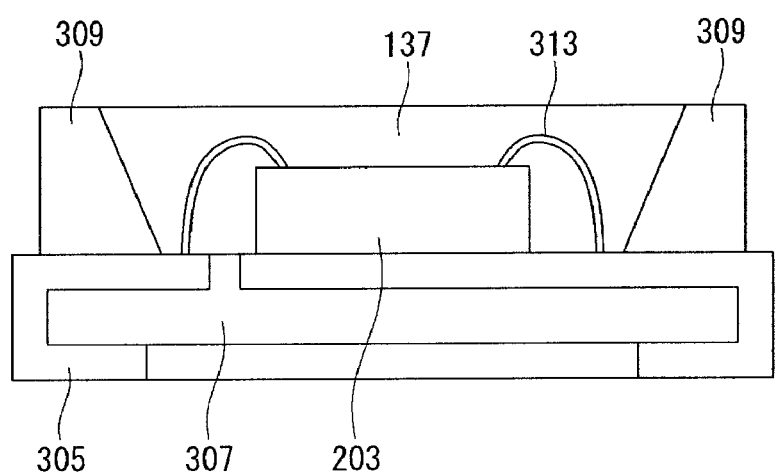

Referring to FIG. 7, the POB type light assembly 124 may include one or more wires 313 on both sides of the light source 203 on the light source 203. The at least one wire 313 may electrically connect the light source 203 and the lead frame 305.

The light source 203 may be formed of a combination of a P type semiconductor that provides holes to the light source for substantially generating light and an N type semiconductor that provides electrons to the light source.

A fluorescent layer 137 may be placed on the light source 203 between the reflection plates 309. The fluorescent layer 137 may cover the light source. Furthermore, the fluorescent layer 137 may be surrounded by the reflection plates 309. The fluorescent layer 137 may include a fluorescent substance for converting light of a spectrum, generated by the light source 203, into white light. The fluorescent layer 137 may have the same thickness on the light source 203. Furthermore, the fluorescent layer 137 may have the same height as the top of the reflection plates 309. The fluorescent layer 137 may have a refractive index of 1.4 to 2.0.

The light assembly 124 in accordance with an embodiment of the present invention can improve reliability of a process. Accordingly, when the light assembly 124 is fabricated, additional investment may not be required. In this case, high-current driving may not be easy because a heat-dissipation characteristic is limited.

Figure 8:
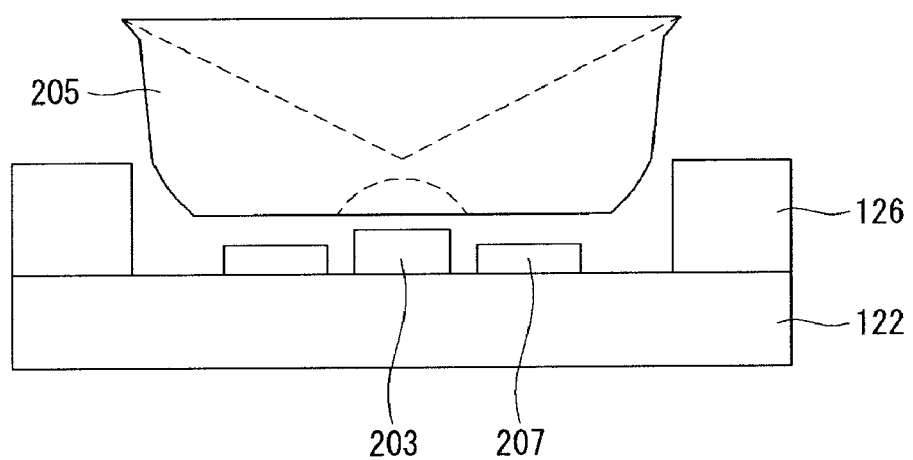

Referring to FIG. 8, the light assembly 124 may include the light source 203, a lens 205, and a reflection ring 207.

The light source 203 may be placed on the substrate 122. The light source 203 may be placed in the central part of the light assembly 124, but is not limited thereto. In some embodiments, the light source 203 may be placed in a portion other than the central part of the light assembly 124.

The light source 203 may emit light in response to an electrical signal. For example, the light source 203 may emit light in a third direction in response to an electrical signal, but is not limited thereto. In some embodiments, the light source 203 may emit light in a direction, tilted at a specific angle from the third direction, in response to an electrical signal.

The lens 205 may be placed over the light source 203. The lens 205 may have a larger diameter than the light source 203. In other words, the lens 205 may be configured to surround the light source 203. The lens 205 may change the direction in which light emitted by the light source 203 travels and send the light to the display panel. A detailed structure of the lens 205 is described later.

The upper part of the lens 205 may include a protrusion 213 having an outside part protruded. In other words, the diameter of the upper part of the lens 205 may be greater than that of the lower part of the lens 205.

The lens 205 may be surrounded by the reflection sheet 126. The diameter of a region in which the reflection sheet 126 is not provided may be greater than the diameter of the bottom of the lens 205 and may be smaller than the diameter of the top of the lens 205. That is, the outside region of the top of the lens 205 may overlap with one end of the reflection sheet 126 in the first and the second directions.

The lens 205 may include a substance having a refractive index of 1 or more to 1.5 or less. For example, the lens 205 may include any one of polymethyl mata acrylate (PMMA), cylic olefin copolymer (COC), or a combination of them.

A top surface of the reflection sheet 126 may be higher than the bottom surface of the lens 205 and lower than the top surface of the lens 205, but is not limited thereto. The top surface of the reflection sheet 126 may be lower than the bottom surface of the lens 205.

The reflection ring 207 surrounding the light source 203 may be placed. The reflection ring 207 may not come in contact with the light source 203. The reflection ring 207 may include a first plane configured to face the light source 203, a second plane configured to face the reflection sheet 126, and a third plane configured to face the lens 205.

The reflection ring 207 may include the same substance as the reflection sheet 126 or may include a substance similar to the substance of the reflection sheet 126. For example, the reflection ring 207 may include at least one of metal and metal oxides, that is, reflection substances. The reflection ring 207 may have reflectance higher than the substrate 122.

The reflection ring 207 may have been separated from the reflection sheet 126 at a specific interval. The reflection ring 207 may reflect light incident on the inside of the diameter of the lens unlike in the reflection sheet 126. A detailed function and structure of the reflection ring 207 are described later.

The light assembly 124 may be a chip on board (COB) type light assembly 124. Specifically, the light assembly 124 may be the light assembly 124 in which a chip is mounted right on a substrate.

In the light assembly 124 according to the present embodiment, the light source 203 may be placed on the substrate 122. Accordingly, the size and weight of the light assembly 124 can be reduced.

Figure 9:
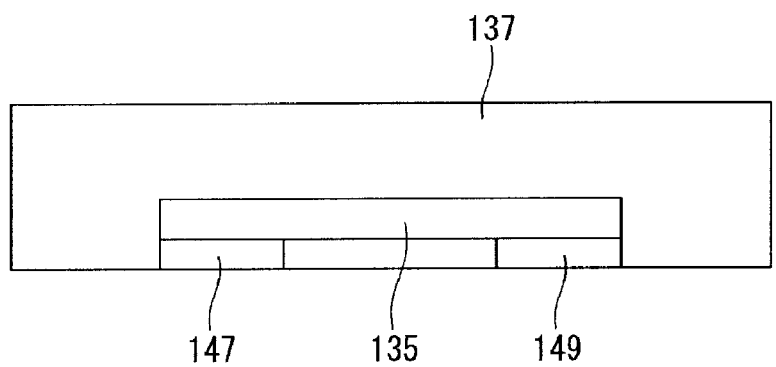

Referring to FIG. 9, the light source 203 of the light assembly 124 in accordance with an embodiment of the present invention may have a COB type. The COB type light source 203 of the light assembly 124 may include at least one of a light-emitting layer 135, first and second electrodes 147 and 149, and a fluorescent layer 137.

The light-emitting layer 135 may be placed on the substrate 122. The light-emitting layer 135 may emit any one color of blue, red, and green. The light-emitting layer 135 may include Firpic, (CF3ppy)$_2$Ir (pic), 9, 10-di (2-naphthyl) anthracene (AND), perylene, distyrybiphenyl, PVK, OXD-7, UGH-3 (blue), and a combination of them.

The first and the second electrodes 147 and 149 may be placed on both sides of the bottom surface of the light-emitting layer 135. The first and the second electrodes 147 and 149 may transfer an external driving signal to the light-emitting layer 135.

The fluorescent layer 137 may cover the light-emitting layer 135 and the first and the second electrodes 147 and 149. The fluorescent layer 137 may include a fluorescent substance for converting light of a spectrum, generated by the light-emitting layer 135, into white light. The fluorescent layer 137 may have the same thickness on the light-emitting layer 135. The fluorescent layer 137 may have a refractive index of 1.4 to 2.0.

The light assembly 124 in accordance with an embodiment of the present invention may have light-emitting efficiency because the light source 203 is placed right on the substrate 122. Accordingly, the size of the light assembly 124 can be reduced.

Furthermore, the light assembly 124 may be driven by a high current because the light source 203 is placed right on the substrate 122 and heat dissipation is excellent. Accordingly, the number of light assemblies 124 for the backlight unit 120 can be reduced.

Furthermore, the light assembly 124 may not require a wire bonding process because the light source 203 is placed right on the substrate 122. Accordingly, a cost can be reduced because the process is simplified.

In such a COB type light assembly 124, light may laterally leak because a reflection plate is not present and the light does not pass through the lens 205 unlike in an existing POB type light assembly. The reflection ring 207 can prevent light from laterally leaking.

Hereinafter, a construction in which the light source package 303 is placed on the substrate 122 is omitted, and only a construction in which the light source 203 is placed on the substrate 122 is illustrated, for convenience of description.

Figure 10:
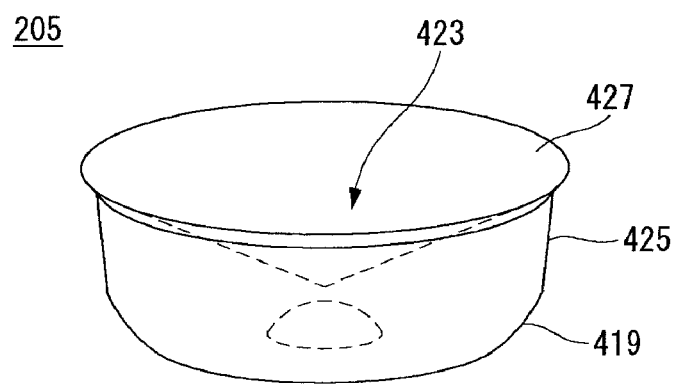
Figure 10:
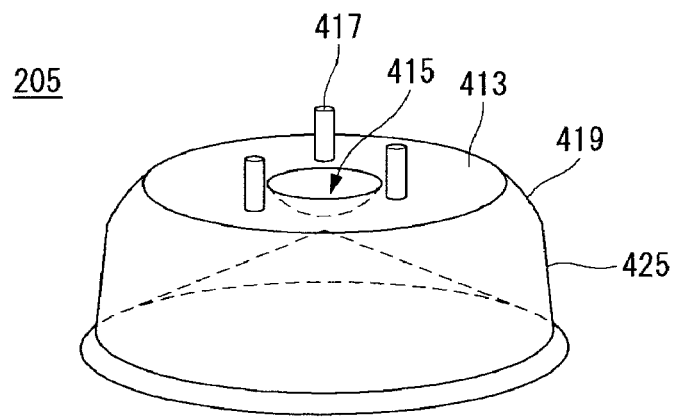

Referring to FIG. 10, the lens 205 may include the bottom surface 413, a conical groove 415, support parts 417, a conical side part 419, an inverse-conical groove 423, an inverse-conical side part 425, and the top surface 427.

The conical groove 415 may be placed in the central part of the bottom surface 413. Specifically, the conical groove 415 may be configured to be burrowed from the central part of the bottom surface 413 to the upper side of the lens 205. The conical groove 415 may have a conical shape in which a vertex surrounding the light source has been cut. The conical groove 415 may transfer light, emitted by the light source, to the side or top surface of the lens 205.

The support parts 417 may be placed in a region which surrounds the outside in which the conical groove 415 is connected to the bottom surface 413. The support parts 417 may be placed in the places where the conical groove 415 divides the outside connected to the bottom surface 413 into three, but is not limited thereto. The support parts 417 may be placed in the places where the conical groove 415 divides the outside connected to the bottom surface 413 into three or more. The support parts 417 may have been protruded from the bottom surface 413 to the outside of the lens 205. The support parts 417 may have a cylinder, a trigonal prism, or a rectangular parallelepiped.

The support parts 417 may couple the lens 205 and the substrate. The lens 205 may have been spaced apart from the substrate at a specific interval by the support parts 417. Accordingly, the light source and the reflection ring may be placed between the lens 205 and the substrate.

The conical side part 419 may extend from the bottom surface 413 to the top surface 427. The length of the conical side part 419 in the third direction may be the same as that of the conical groove 415 in the third direction, but is not limited thereto. The length of the conical side part 419 in the third direction may be longer than that of the conical groove 415 in the third direction. The conical side part 419 may refract light which is reflected by the inverse-conical groove 423 or is directly incident from the conical groove 415.

The inverse-conical groove 423 may be placed in the central part of the top surface 427. Specifically, the inverse-conical groove 423 may be configured to be burrowed from the central part of the top surface 427 to the bottom surface 412. The inverse-conical groove 423 may have a shape opposite a shape in which a vertex has been cut. The center of the inverse-conical groove 423 may be matched up with the center of the conical groove 415. The inverse conical groove 423 may induce total reflection of incident light and transfer the light to the side or the bottom surface 413.

The inverse-conical side part 425 may extend from the top surface 427 to the bottom surface 413. The inverse-conical side part 425 may have been extended from the conical side part 419. The length of the inverse-conical side part 425 in the third direction may be the same as that of the conical groove 415 in the third direction, but is not limited thereto. The length of the inverse-conical side part 425 in the third direction may be longer than that of the inverse-conical groove 423 in the third direction. The inverse-conical side part 425 may refract light which is totally reflected by the inverse-conical groove 423.

Figure 11:
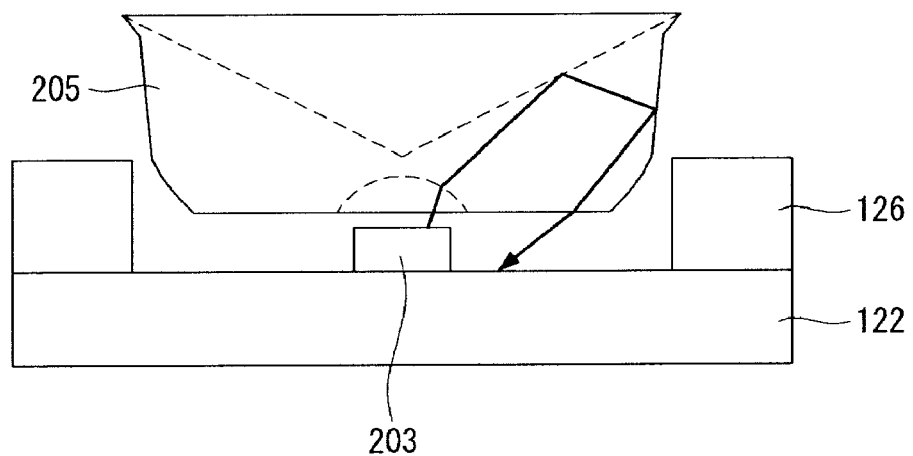
Figure 11:
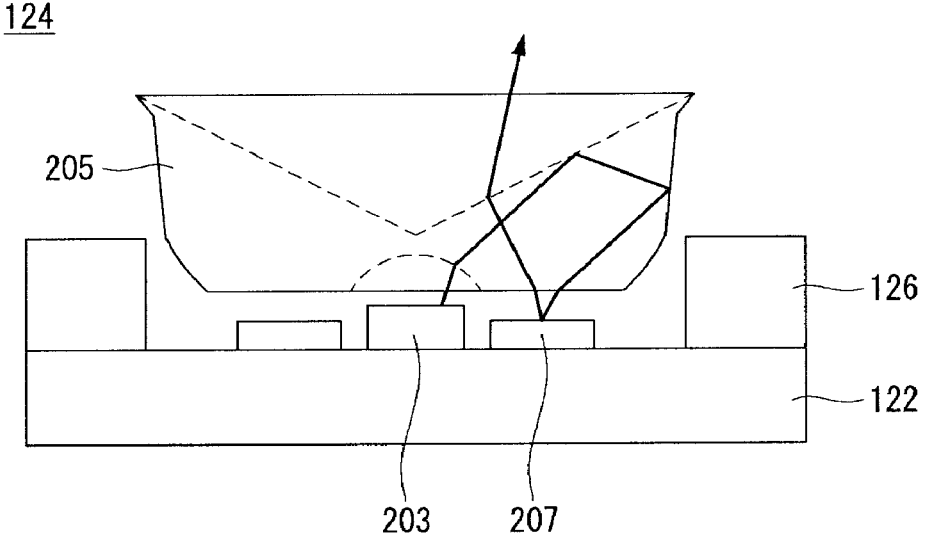

Referring to FIG. 11, when the reflection ring 207 is not present, light emitted from the light source 203 to the upper side may be totally reflected by the inverse-conical groove (423 of FIG. 10). The light totally reflected by the inverse-conical groove (423 of FIG. 10) may be totally reflected from the inverse-conical side part (425 of FIG. 10) to the bottom surface (413 of FIG. 10). The light totally reflected by the bottom surface (413 of FIG. 10) may be refracted and directed toward the substrate 122.

At least part of the light refracted by the substrate 122 may be absorbed by the substrate 122. Accordingly, the amount of light transferred to the upper side of the lens 205 may be small. As a result, luminance uniformity of the backlight unit may be reduced.

In contrast, when the reflection ring 207 is present, light refracted toward the substrate 122 may be reflected toward the reflection ring 207 and refracted by the bottom surface (413 of FIG. 10). The light refracted by the bottom surface (413 of FIG. 10) may be refracted by the inverse-conical groove (423 of FIG. 10) again and directed toward the top surface (427 of FIG. 10) of the lens. Accordingly, the amount of light transferred to the upper side of the lens 205 may be much. As a result, luminance uniformity of the backlight unit may be increased.

Figure 12:
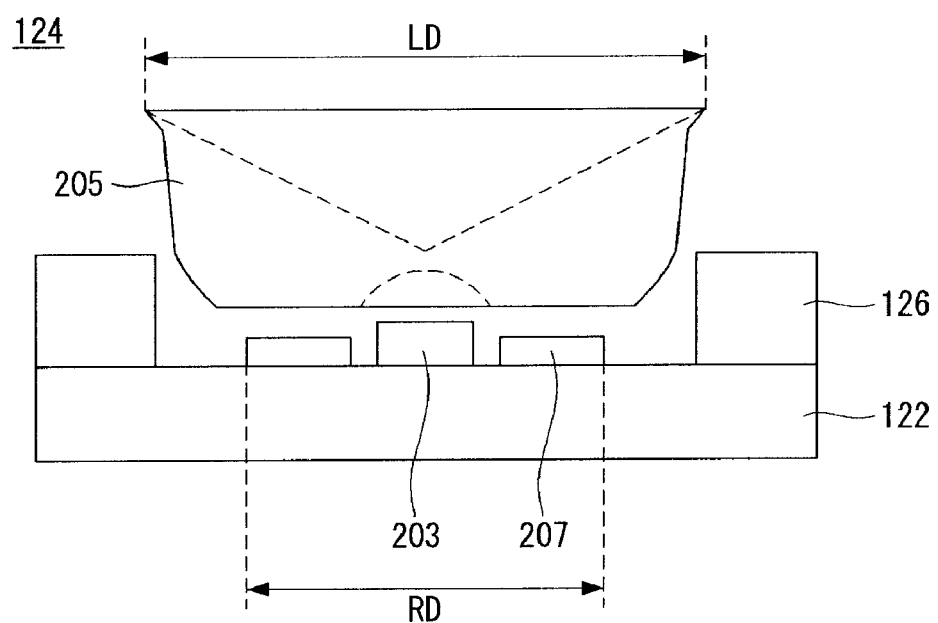

Referring to FIG. 12, the diameter LD of the lens 205 may be greater than the diameter RD of the reflection ring 207. For example, if the diameter LD of the lens may be 25 mm or more to 28 mm or less, the diameter RD of the reflection ring 207 may be 22.5 mm.

The thickness of the reflection ring 207 may be different from the height of the reflection sheet 126. Specifically, the thickness of the reflection ring 207 may be smaller than that of the reflection sheet 126 because the reflection sheet 126 reflects light incident from the lens 205 and the reflection ring 207 reflects light incident from the light source 203 lower than the lens 205.

The diameter RD of the reflection ring 207 may not be greater than the diameter LD of the lens 205 because the reflection ring 207 functions to reflect light incident on the power side of the lens 205.

The reflection sheet 126 may be configured to surround the lens 205. Accordingly the reflection sheet 126 may be placed outside the lens 205. Since the reflection sheet 126 needs to surround the lens 205, the height of the top surface of the reflection sheet 126 may be higher than that of the bottom surface 413 of the lens 205.

Figure 13:
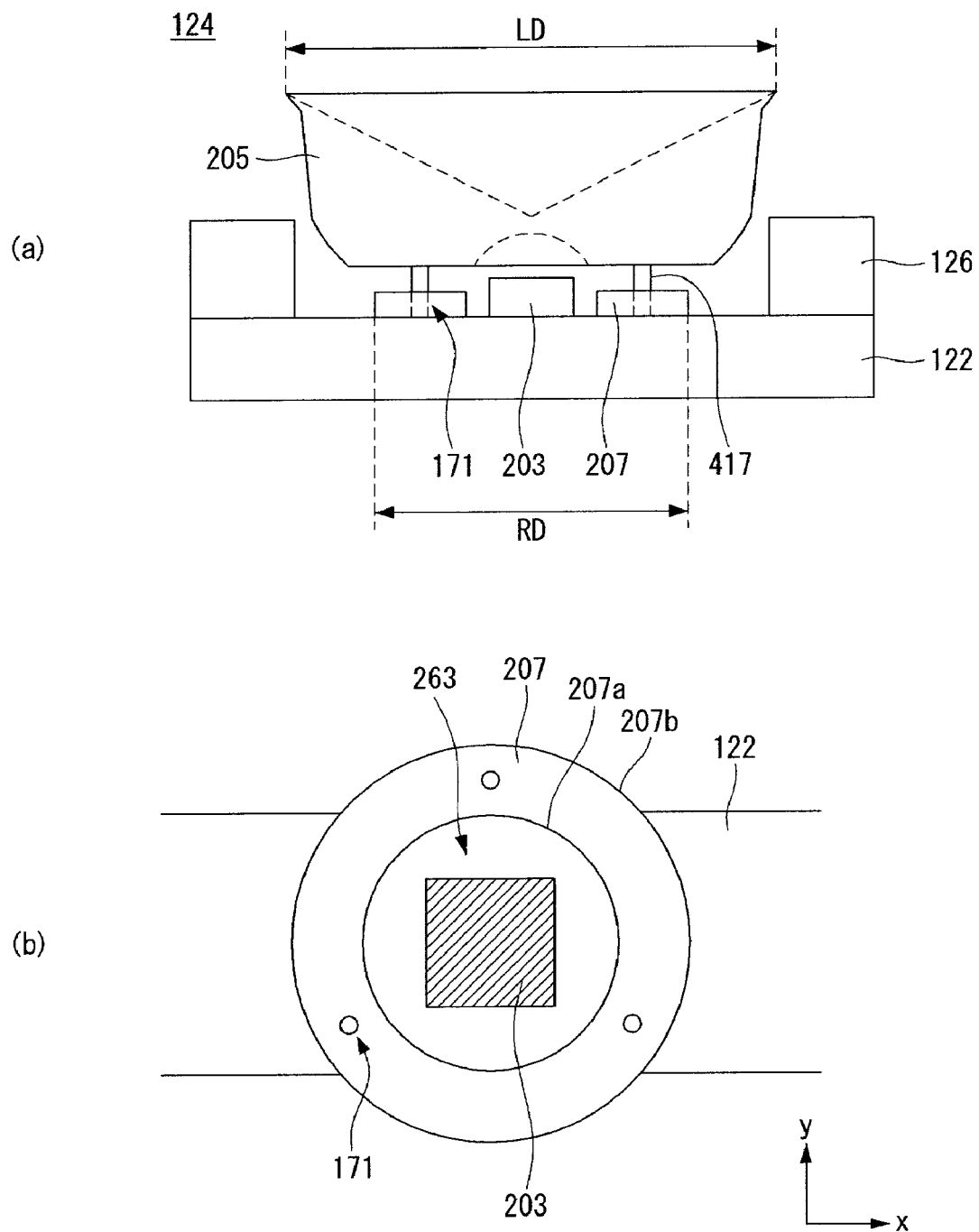

Referring to FIG. 13, one or more holes 171 may be formed in the reflection ring 207 so that the support parts 417 of the lens 205 are coupled to the substrate 122. If a hole is not formed in the reflection ring 207, the lens 205 may not be fixed to the substrate 122. Accordingly, the lens 205 may be easily separated from the reflection ring 207 or may be easily damaged. Furthermore, light emitted by the light source 203 may not be uniform.

The one or more holes 171 may be placed in portions corresponding to the support parts 417 of the lens 205. Accordingly, the support parts 417 of the lens 205 may be inserted into the one or more holes 171 and coupled to the substrate 122. The diameter of the hole 171 may be equal to or greater than the diameter of the support part 417 so that the support part 417 is inserted into the hole 171. In embodiments to be described later, the one or more holes 171 and the support parts 417 are not illustrated for convenience of description. However, this can be applied to other embodiments.

Figure 14:
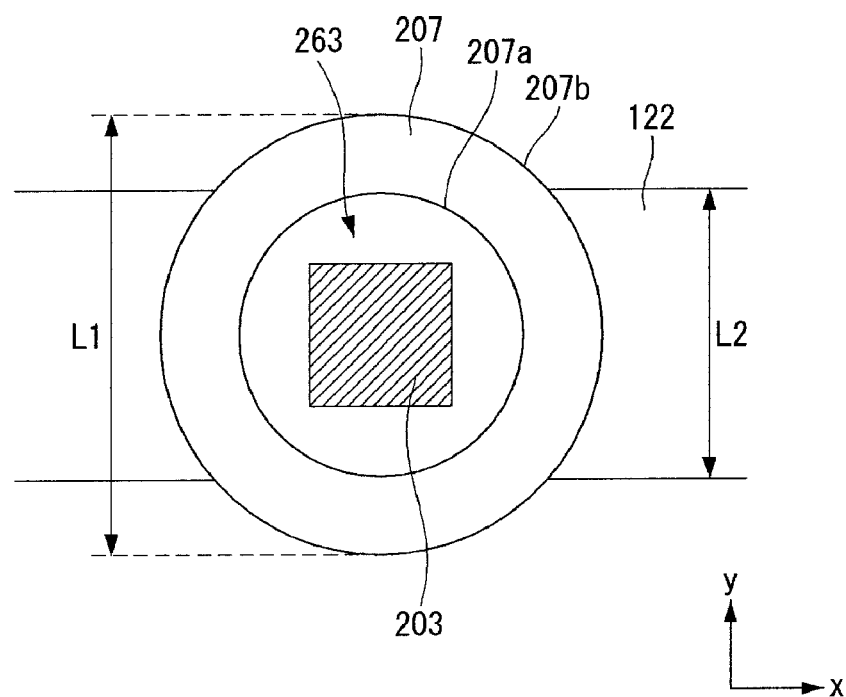
Figure 15:
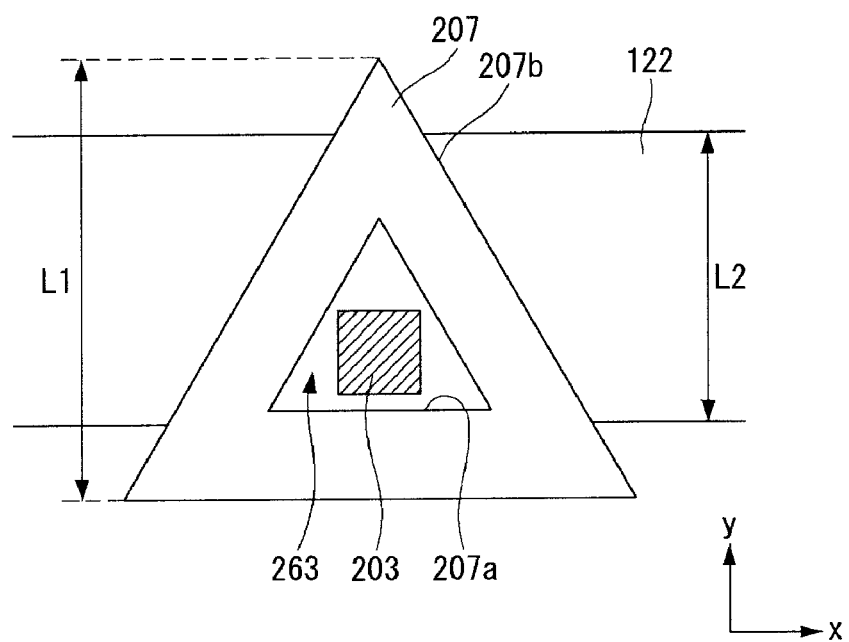
Figure 16:
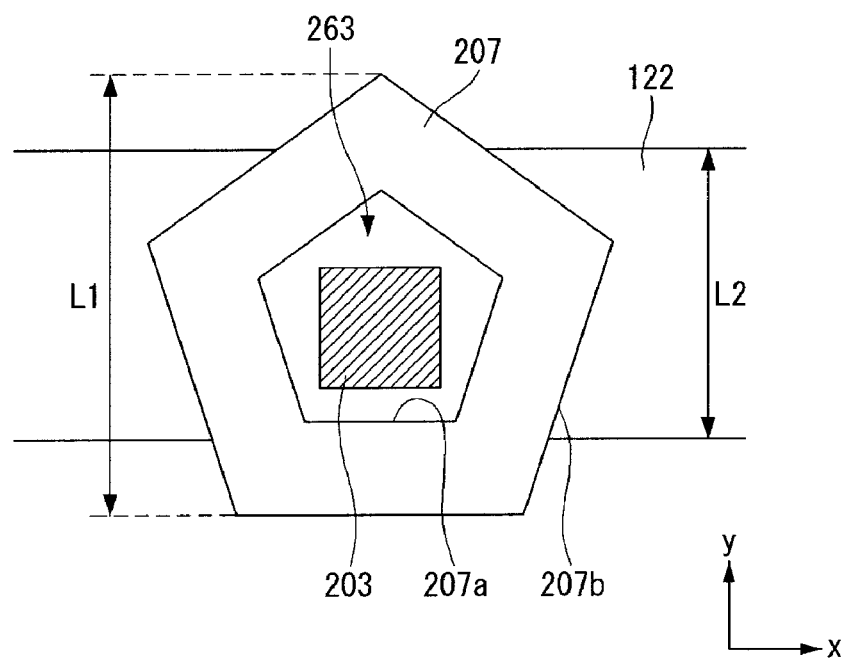

Referring to FIGS. 14 to 16, the reflection ring 207 may have a circle, a triangle, or a pentagon which surrounds the light source 203. Both the outside 207b and inside 207a of the reflection ring 207 may have a circle, a triangle, or a pentagon. If the reflection ring 207 has a circle, a triangle, or a pentagon which surrounds the light source 203, the peripheral part of the lens may be brighter than the central part of the lens in the backlight unit.

The reflection ring 207 may include an opening portion 263. The opening portion 263 may be spaced apart from the light source at a specific interval.

The width L1 of the reflection ring 207 in the second direction may be greater than the width L2 of the substrate 122 in the second direction. The diameter of the lens may be greater than the width of the substrate 122 in the second direction. The width L1 of the reflection ring 207 in the second direction may be almost similar to the diameter of the lens because a portion on which light is incident needs to be placed under the lens. Accordingly, the width L1 of the reflection ring 207 in the second direction may be greater than the width L2 of the substrate 122 in the second direction.

In the backlight unit in accordance with an embodiment of the present invention, at least some of light in all the directions which is incident on the lower side of the lens 205 can be reflect toward the upper side of the lens 205 because the reflection ring 207 is configured to surround the light source 203. Accordingly, luminance uniformity of the backlight unit can be improved.

Figure 17:
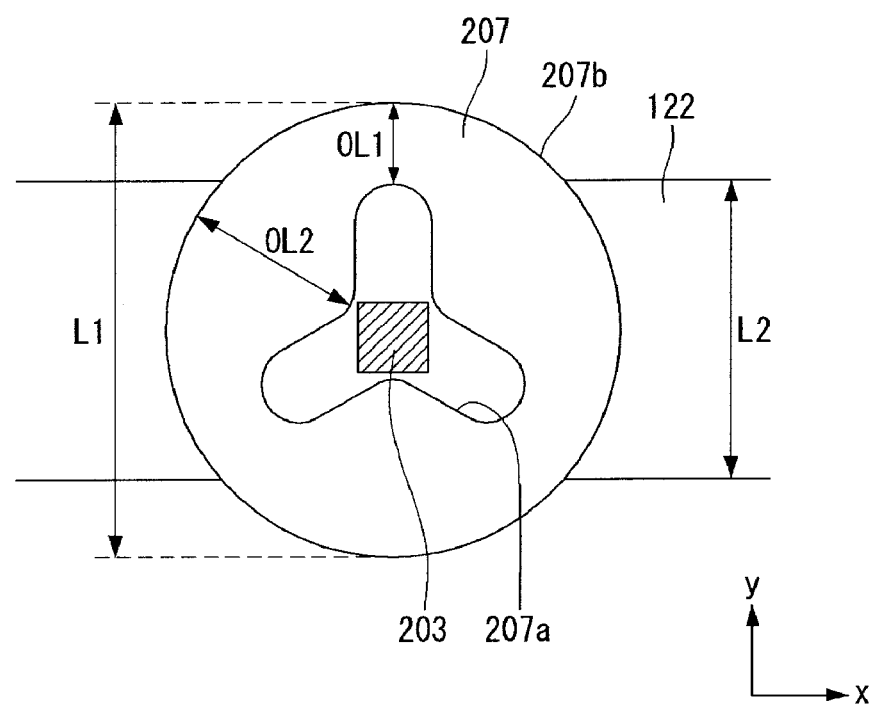

Referring to FIG. 17, the reflection ring 207 may be configured to surround the light source 203. Specifically, the inside 207a of the reflection ring 207 may have at least three protrusions. Accordingly, the distance between the inside 207a and outside 207b of the reflection ring 207 may be changed gradually alternately from a first distance OL1 to a second distance OL2. If the reflection ring 207 is configured to surround the light source 203 and the distance between the inside 207a and the outside 207b is changed gradually alternately, the central part of the lens may be brighter than the peripheral part of the lens in the backlight unit.

The width L1 of the reflection ring 207 in the second direction may be greater than the width L2 of the substrate 122 in the second direction. The diameter of the lens may be greater than the width of the substrate 122 in the second direction. The width L1 of the reflection ring 207 in the second direction may be almost similar to the diameter of the lens because a portion on which light is incident needs to be placed under the lens. Accordingly, the width L1 of the reflection ring 207 in the second direction may be greater than the width L2 of the substrate 122 in the second direction.

In the backlight unit in accordance with an embodiment of the present invention, at least some of light in all the directions which is incident on the lower side of the lens 205 can be reflect toward the upper side of the lens 205 because the reflection ring 207 is configured to surround the light source 203. Accordingly, luminance uniformity of the backlight unit can be improved.

Figure 18:
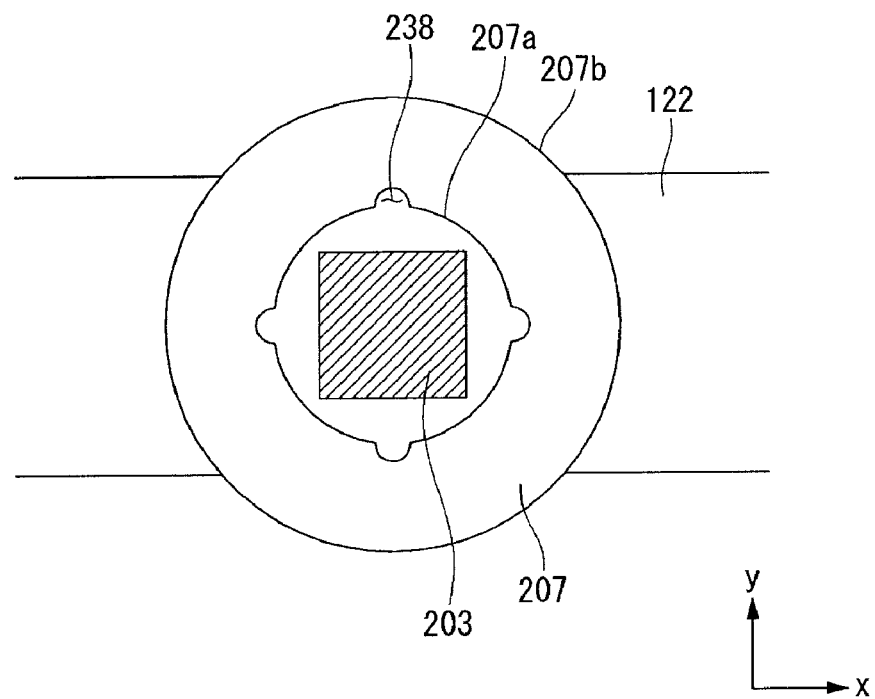

Referring to FIG. 18, at least one groove 238 may be placed in the inside 207a of the reflection ring 207. The at least one groove 238 may be protruded from the direction of the inside 207a to the direction of the outside 207b. The at least one groove 238 may have a hemispherical shape, but is not limited thereto. The at least one groove 238 may have a triangle, a circle, or a rectangular shape.

The at least one groove 238 may be matched up with at least one protrusion placed in the substrate 122. Accordingly, when the reflection ring 207 is mounted on the substrate 122, it can be mounted on the substrate 122 more easily.

The backlight unit in accordance with an embodiment of the present invention may include the at least one groove 238 in the inside 207a of the reflection ring 207. Accordingly, when the reflection ring 207 is mounted on the substrate 122, the location in which the reflection ring 207 is mounted can be matched up by the at least one groove 238.

Figure 19:
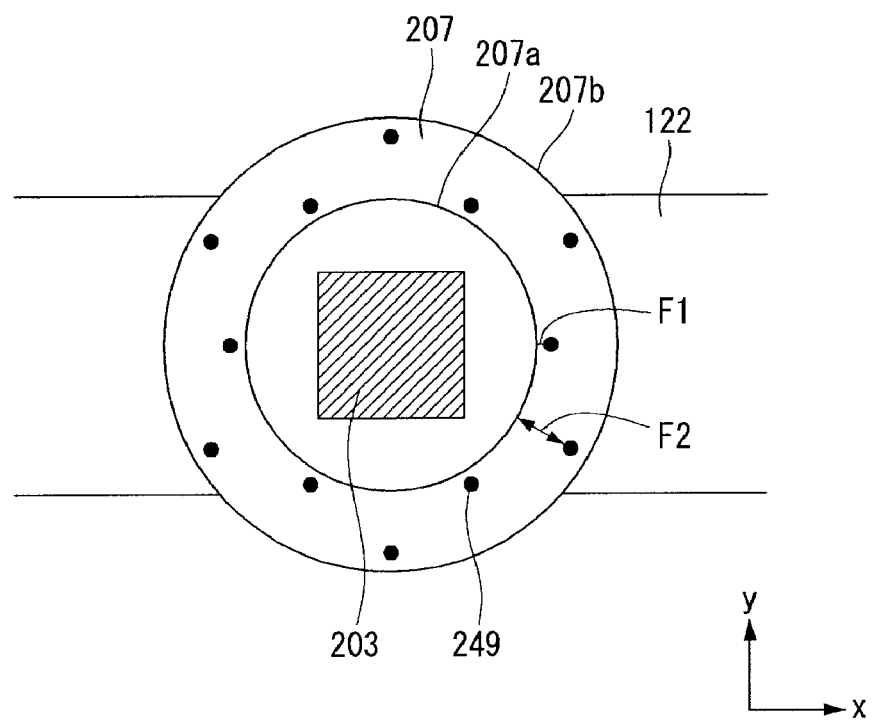

Referring to FIG. 19, at least one pattern 249 may be provided on the top surface of the reflection ring 207. The at least one pattern 249 may have a circle, but is not limited thereto. The at least one pattern 249 may have a triangle, a rectangular shape, or a star shape.

The at least one pattern 249 may include a plurality of regions whose at least one of the location, shape, and color is different. One region and the other region may be repeatedly formed in the plurality of regions.

The at least one pattern 249 may be placed in the position spaced apart from the inside 207a of the reflection ring 207 at a third distance F1. Furthermore, the at least one pattern 249 may be placed in the position spaced apart from the inside 207a of the reflection ring 207 at a fourth distance F2.

Only one pattern 249 may be placed in a line which connects the inside 207a and outside 207b of the reflection ring 207. In other words, the at least one pattern 249 may be placed on the reflection ring 207 in zigzags.

The at least one pattern 249 may have been engraved in the reflection ring 207 in accordance with an embodiment of the present invention in zigzags. Accordingly, the backlight unit can maintain uniform luminance by controlling the amount of light reflected toward the upper side of the lens.

Figure 20:
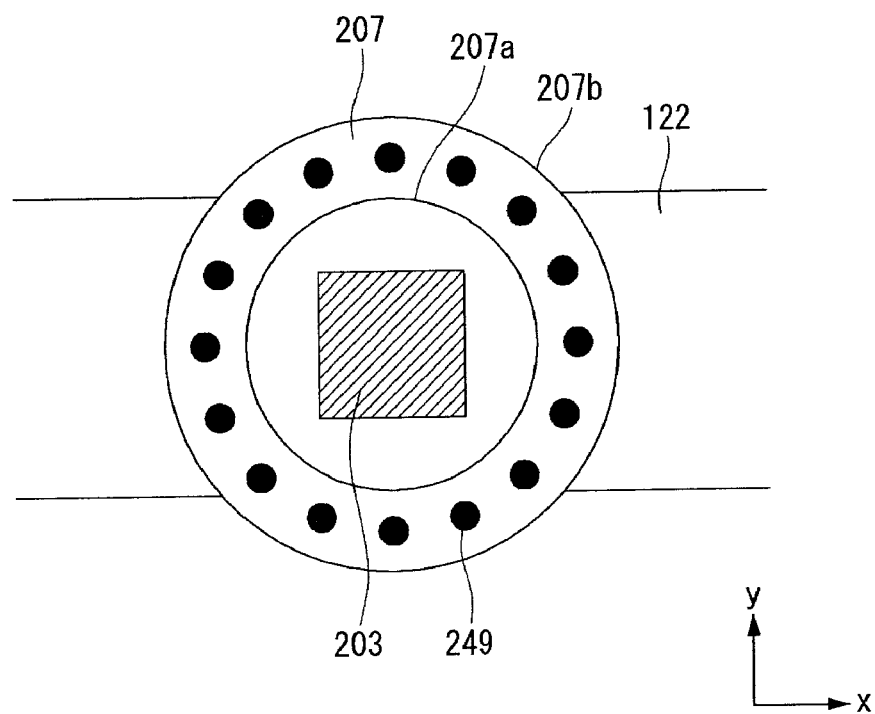

Referring to FIG. 20, the at least one pattern 249 may be placed only in the position spaced apart from the inside 207a of the reflection ring 207 at a specific interval. The at least one pattern 249 may be placed in the middle between the inside 207a and outside 207b of the reflection ring 207.

The reflection ring 207 in accordance with an embodiment of the present invention can simplify the process and reduce a cost because the patterns are not placed in zigzags, but are placed in a single line.

Figure 21:
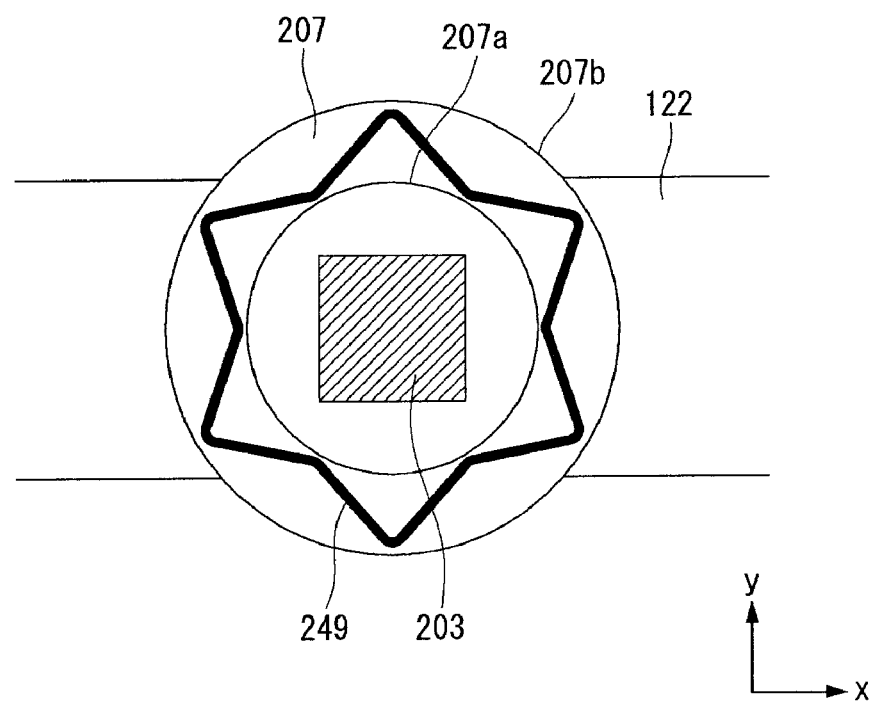

Referring to FIG. 21, the one or more patterns 249 placed in zigzags may be connected to one. The connected pattern 249 may surround the light source 203. The connected pattern 249 may have a shape in which the protrusion is repeated.

In the reflection ring 207 in accordance with an embodiment of the present invention, since the one or more patterns 249 are connected to one, the amount of light in the front direction can be controlled compared to the case where the one or more patterns 249 are separately placed. Accordingly, the backlight unit can maintain uniform luminance.

Figure 22:
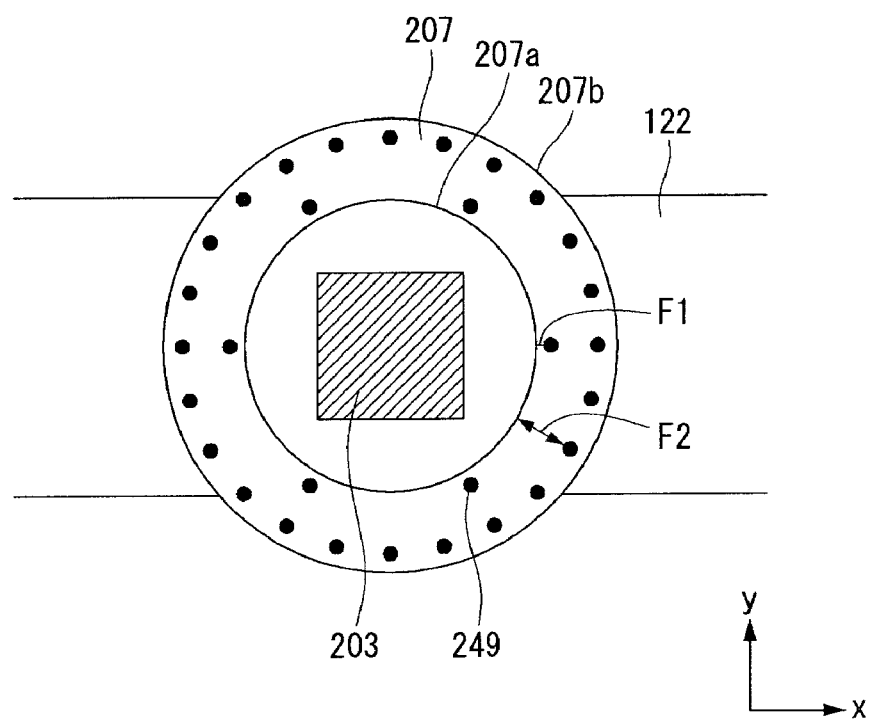

Referring to FIG. 22, the at least one pattern 249 may be placed in the location spaced apart from the inside 207a of the reflection ring 207 at the third distance F1 and the fourth distance F2. In the reflection ring 207, the number of patterns 249 placed in the fourth distance F2 may be greater than the number of patterns 249 placed in the third distance F1. For example, the number of patterns 249 spaced apart from the inside 207a at the third distance F1 may be twice or more than the number of patterns 249 spaced apart from the inside 207a at the fourth distance F2.

In the reflection ring 207 in accordance with an embodiment of the present invention, since the number of patterns 249 placed in the fourth distance F2 is greater than the number of patterns 249 placed in the third distance F1, less light can be reflected toward the outskirt part of the reflection ring 207 to which more light is directed. Accordingly, the backlight unit can maintain uniform luminance.

Figure 23:
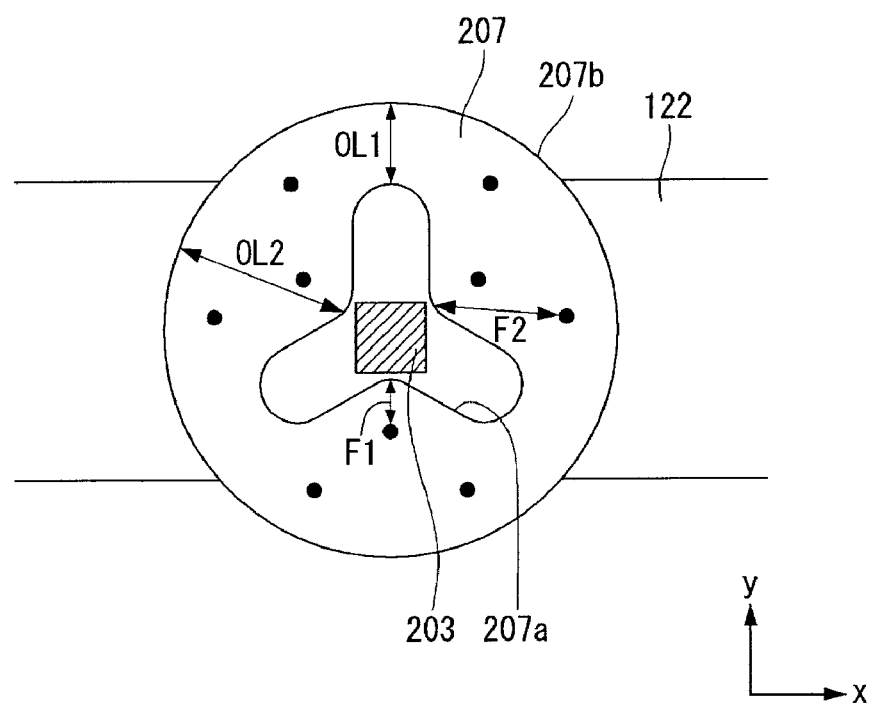

Referring to FIG. 23, the inside 207a of the reflection ring 207 may have at least three protrusion. The distance between the inside 207a and outside 207b of the reflection ring 207 may be changed gradually alternately from a first distance OL1 to a second distance OL2.

The at least one pattern 249 may be placed in the location space apart from a portion in which the inside 207a of the reflection ring 207 has been depressed at the third distance F1 and the fourth distance F2. The at least one pattern 249 may be placed on the reflection ring 207 in zigzags.

If the reflection ring 207 in accordance with an embodiment of the present invention is configured to surround the light source 203 and the distance between the inside 207a and the outside 207b is configured to change gradually alternately, the central part of the lens may be brighter than the peripheral part of the lens in the backlight unit.

Furthermore, in the reflection ring 207 in accordance with an embodiment of the present invention, the at least one pattern 249 may have been engraved in the reflection ring 207 in zigzags. Accordingly, the backlight unit can maintain uniform luminance by controlling the amount of light reflected toward the upper side of the lens.

Figure 24:
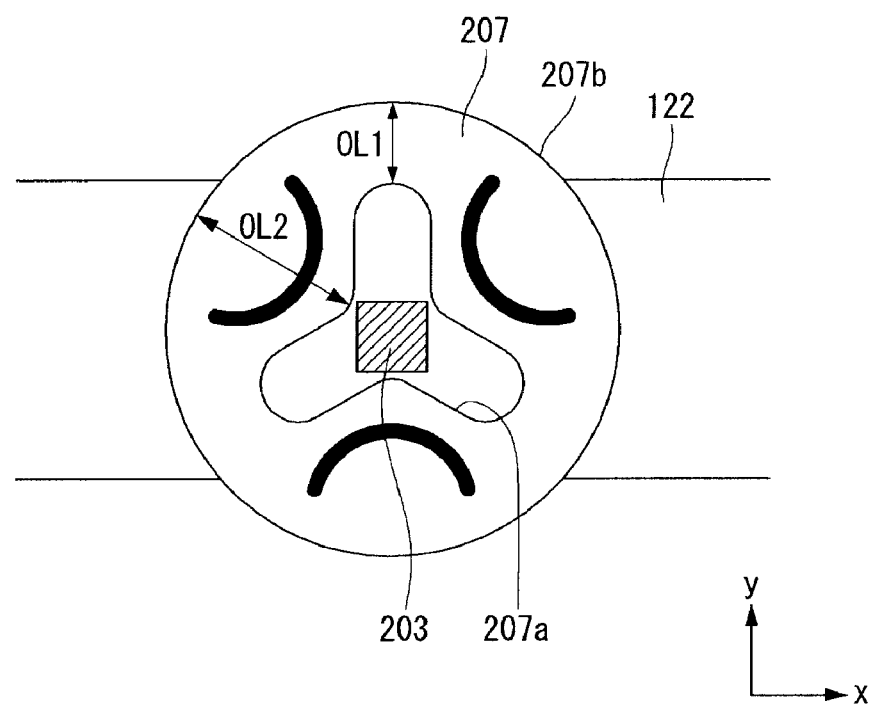

Referring to FIG. 24, the inside 207a of the reflection ring 207 may have at least three protrusions, and the distance between the inside 207a and outside 207b of the reflection ring 207 may change gradually alternately from the first distance OL1 to the second distance OL2.

In the reflection ring 207, the one or more patterns 249 placed in zigzags may be connected to one. The connected pattern 249 may surround the light source 203. The connected pattern 249 may have a shape in which the protrusion is repeated.

If the reflection ring 207 in accordance with an embodiment of the present invention is configured to surround the light source 203 and the distance between the inside 207a and the outside 207b is configured to change gradually alternately, the central part of the lens may be brighter than the peripheral part of the lens in the backlight unit.

Furthermore, in the reflection ring 207 in accordance with an embodiment of the present invention, the one or more patterns 249 are connected to one in the reflection ring 207. Accordingly, the amount of light in the front direction can be controlled compared to the case where the one or more patterns 249 are separately placed. Accordingly, the backlight unit can maintain uniform luminance.

Figure 25:
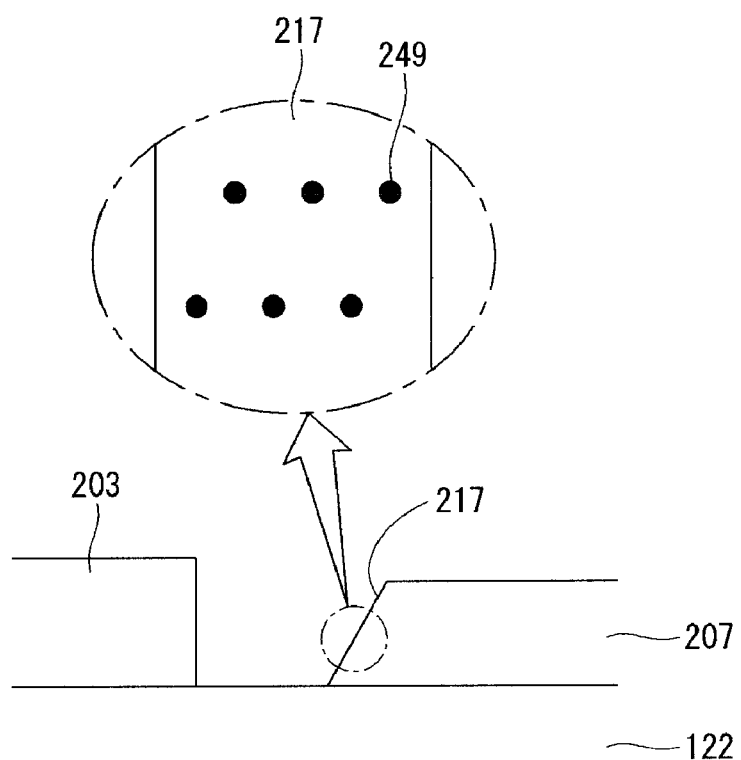

Referring to FIG. 25, the at least one pattern 249 may be placed in a first plane 217 of the reflection ring 207, which faces the light source 203. The at least one pattern 249 may be placed on the first plane 217 in zigzags.

The first plane 217 of the reflection ring 207 may be tilted. If the first plane 217 of the reflection ring 207 is tilted, light efficiency can be improved because the amount of light incident on the side is increased compared to the case where the first plane 217 of the reflection ring 207 is vertical.

The at least one pattern 249 may be engraved in zigzags in the first plane 217 of the reflection ring 207 in accordance with an embodiment of the present invention. Accordingly, the backlight unit can maintain uniform luminance by controlling the amount of light reflected toward the upper side of the lens.

Figure 26:
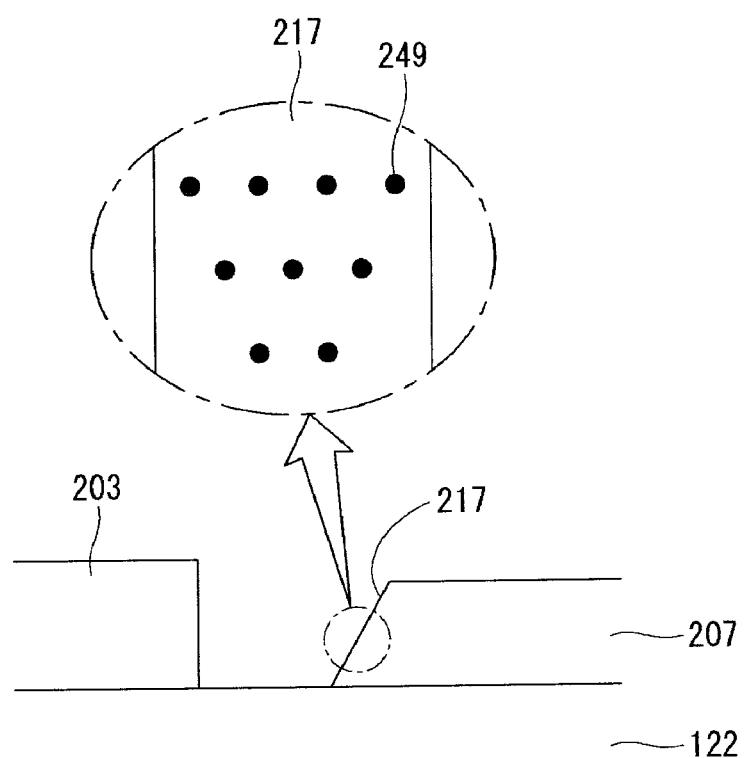

Referring to FIG. 26, the at least one pattern 249 may be placed on the first plane 217 of the reflection ring 207. The at least one pattern 249 may be placed on the first plane 217 of the reflection ring 207 in zigzags.

The first plane 217 of the reflection ring 207 may be tilted. If the first plane 217 of the reflection ring 207 is tilted, light efficiency can be increased because the amount of light incident on the side is increased compared to the case where the first plane 217 of the reflection ring 207 is vertical.

As the first plane 217 of the reflection ring 207 becomes far from the ground, the number of patterns 249 may be increased. In other words, as the height of the first plane 217 of the reflection ring 207 is increased, the number of patterns 249 may be increased.

In the reflection ring 207 in accordance with an embodiment of the present invention, light may be less reflected toward the top of the first plane 217 on which more light is incident because the number of patterns 249 is increased as the first plane 217 of the reflection ring 207 becomes far from the ground. Accordingly, the backlight unit can maintain uniform luminance.

Figure 27:
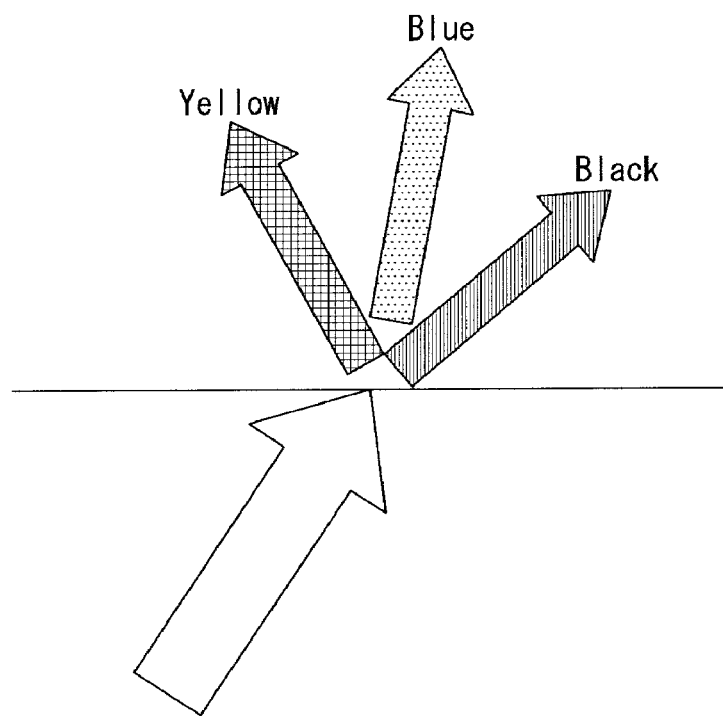

Referring to FIG. 27, when light is incident on two media having different refractive indices, the light may be refracted while passing through the boundary of the two media. A refractive index may be different depending on the wavelength of light. Accordingly, when light is refracted, it may be refracted at a different angle depending on each wavelength. For example, when light is incident from one medium to the other medium, an angle at which yellow light is refracted may be greater than an angle at which blue light is refracted.

In the case of a white LED, a difference between the wavelengths of yellow light and blue light is great. Accordingly, when light is incident on the lens, color may be separated into yellow and blue. If color is separated into yellow and blue, uniformity of color may be deteriorated. In other words, color coordinates may be low around a lens, and color coordinates may be high between lenses.

Figure 28:
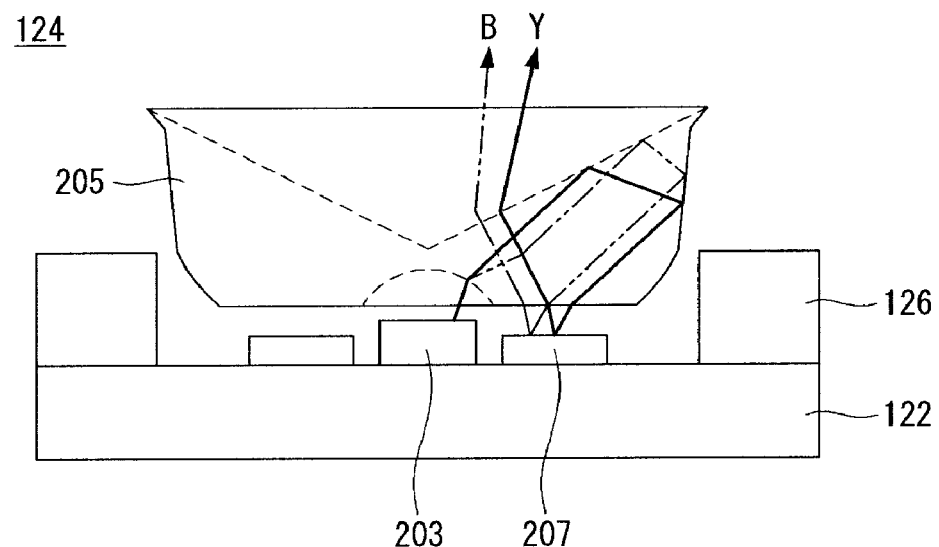
Figure 28:
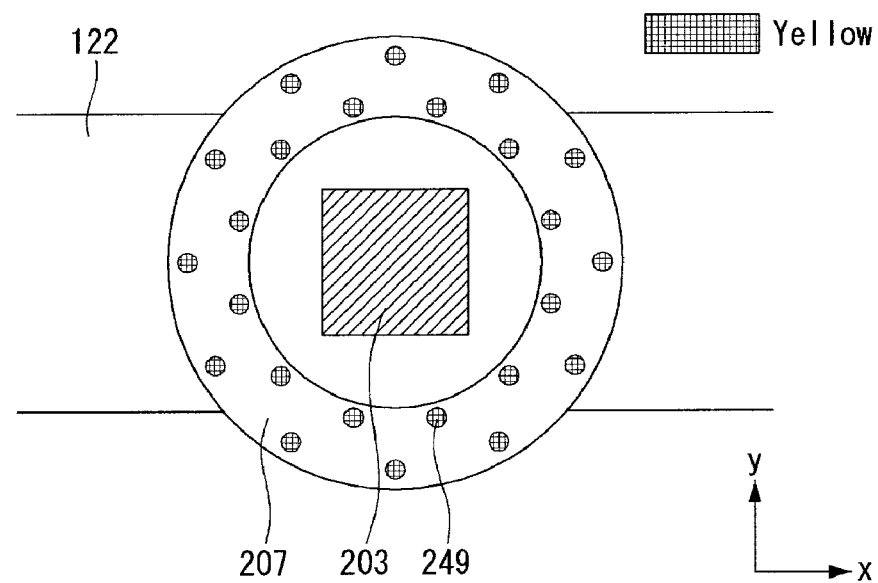

Referring to FIG. 28, in the case of a common backlight unit, when light from the light source 203 is incident on the lens 205, color may be separated into blue B and yellow Y due to a difference between refractive indices according to their wavelengths. Accordingly, light of yellow Y may be reflected toward the outside of the reflection ring 207 compared to light of blue B.

Light reflected by the reflection ring 207 may be refracted by the lens 205, so blue B may more appear in the central part of the lens compared to yellow Y.

In the backlight unit in accordance with an embodiment of the present invention, the at least one pattern 249 of the reflection ring 207 may be yellow. Accordingly, when blue light is reflected in addition to reflected yellow light, light close to yellow may be reflected due to the at least one pattern 249. Accordingly, a phenomenon in which the color of incident light is separated can be reduced.

Figure 29:
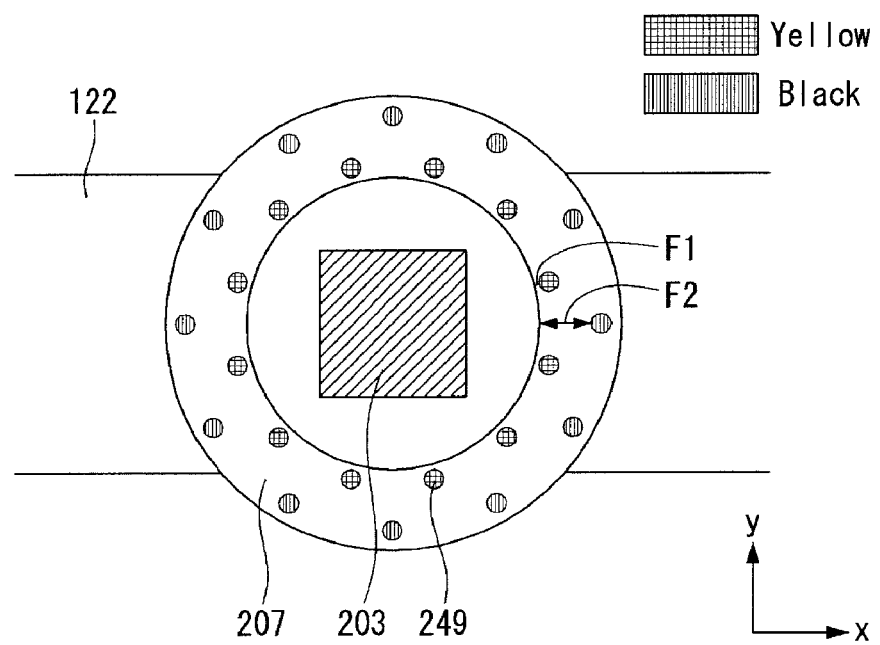

Referring to FIG. 29, only a pattern 249 at the location spaced apart from the inside 207a of the reflection ring 207 at the third distance F1 may include yellow. In other words, the pattern 249 at the location spaced apart from the inside 207a of the reflection ring 207 at the third distance F1 may include yellow, and the pattern 249 at the location spaced apart from the outside 207b at the fourth distance F2 may include black.

The black pattern 249 and the yellow pattern 249 may be placed in zigzags.

In the reflection ring 207 in accordance with an embodiment of the present invention, blue light incident on the inside may become close to yellow light because the pattern 249 at the location spaced apart from the inside 207a at the third distance F1 includes yellow. Accordingly, a phenomenon in which the color of incident light is separated can be reduced.

Furthermore, the backlight unit can have uniform luminance because the pattern 249 at the location spaced apart from the inside 207a at the fourth distance F2 reduces the amount of reflected light.

Figure 30:
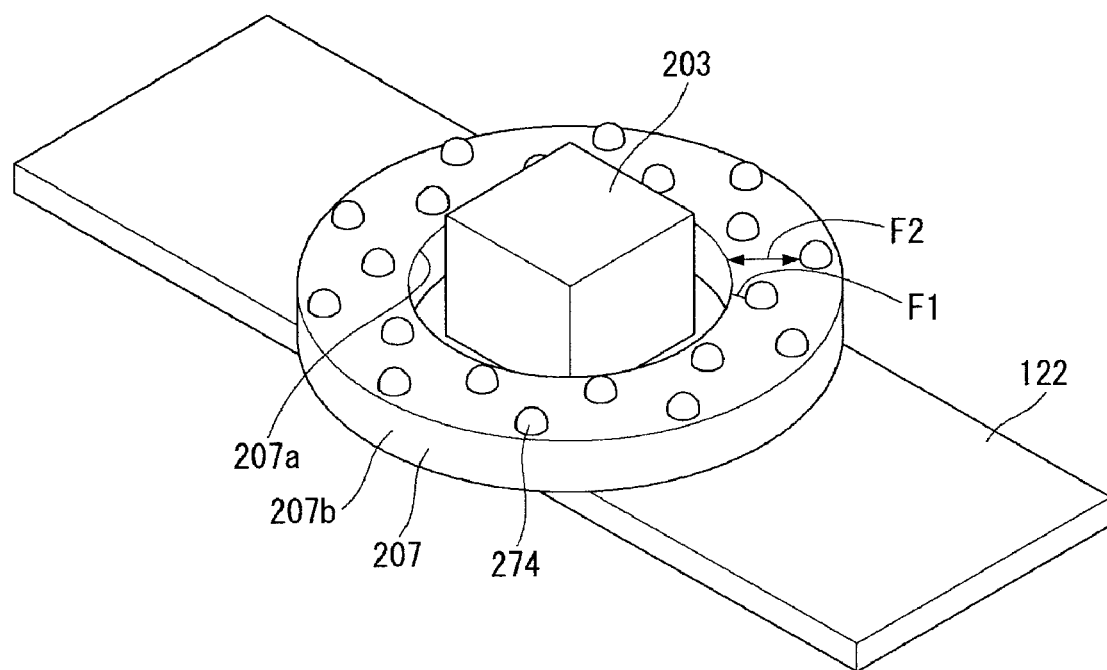

Referring to FIG. 30, protrusions 274 may be placed at the third distance F1 and the fourth distance F2 from the inside 207a of the reflection ring 207. Only a single protrusion 274 may be placed in a line which connects the inside 207a and outside 207b of the reflection ring 207. In other words, at least one protrusion 274 may be placed on the reflection ring 207 in zigzags.

The reflection ring 207 in accordance with an embodiment of the present invention can make uniform luminance of the backlight unit by controlling an angle of light reflected toward the reflection ring 207 because the protrusions 274 are placed on the reflection ring 207 in zigzags.

FIGS. 31 to 43 are diagrams showing another configuration of the display device in accordance with an embodiment of the present invention.

Figure 31:
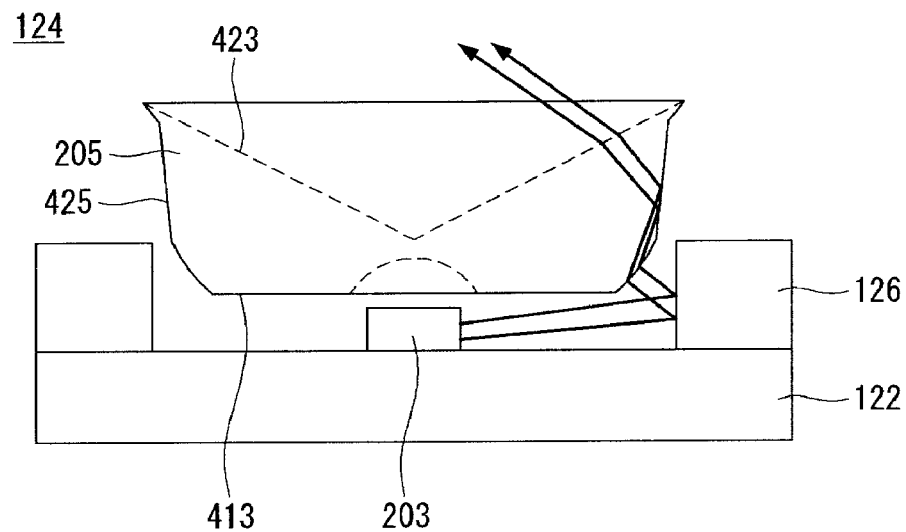
FIGS. 31 to 43 are diagrams showing another configuration of the display device in accordance with an embodiment of the present invention.
Figure 31:
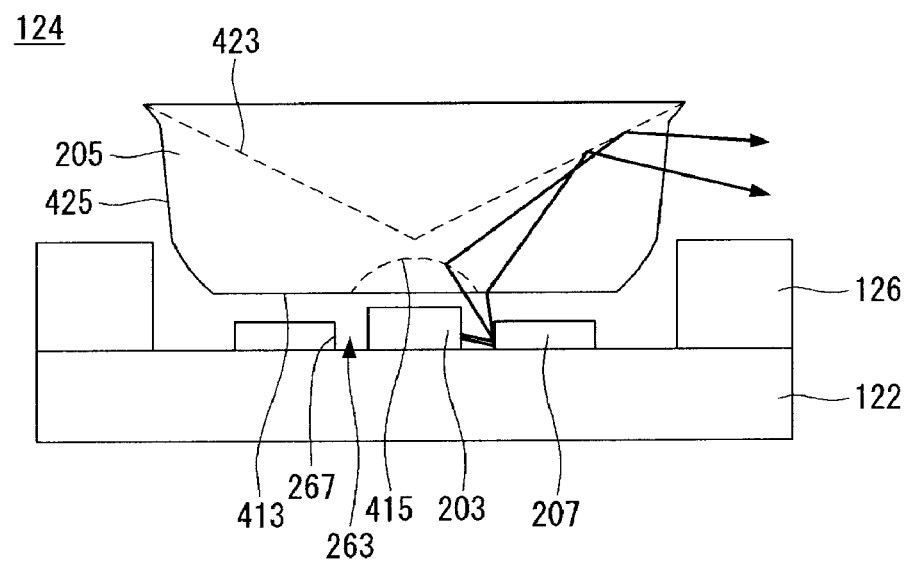

Referring to FIG. 31, a package on board type light assembly, such as that shown in FIG. 6, may have less light that laterally leaks because the reflection plate (309 of FIG. 6) is placed.

In contrast, in a chip on board (COB) type light assembly, such as that shown in FIG. 8, the reflection plate may not be placed. In this case, light may leak out to the side of the light source 203. When light leaks out to the side of the light source 203, a bright point defect may be generated over the lens 205. Accordingly, there may be a problem in that picture quality over the lens 205 is not uniform or not smooth.

Light incident from the side of an existing light source 203 not including the reflection ring 207 may be refracted toward the bottom surface 413 of the lens 205. The refracted light may be totally reflected by the inverse-conical side part 425 of the lens 205. The totally reflected light may be refracted toward an inverse-conical groove 423 and incident on the top of the lens 205.

The light incident from the side of the light source 203 may be directed toward the top of the lens 205. Pieces of the light directed toward the top of the lens 205 may gather and form a bright point defect. Accordingly, the backlight unit may not maintain luminance uniformity.

In the backlight unit in accordance with an embodiment of the present invention, the reflection ring 207 may be placed while surrounding the light source 203. The reflection ring 207 may include the opening portion 263 spaced apart from the light source 203 at a specific interval and a sidewall 267 configured to reflect light emitted by the light source 203. Light incident from the side of the light source 203 may be reflected toward the sidewall 267 of the reflection ring 207. The reflected light may be refracted by the bottom surface 413 or conical groove 415 of the lens 205. The refracted light may be refracted by the inverse-conical side part 425 or may be reflected toward the inverse-conical groove 423 and refracted by the inverse-conical side part 425.

The light refracted by the inverse-conical side part 425 may be dispersed to several places unlike in the case where the reflection ring 207 is not present.

In the backlight unit in accordance with an embodiment of the present invention, side light from the light source 203 may not be concentrated on one place, but may be dispersed in all directions by the reflection ring 207. Accordingly, luminance uniformity of the backlight unit can be maintained.

Figure 32:
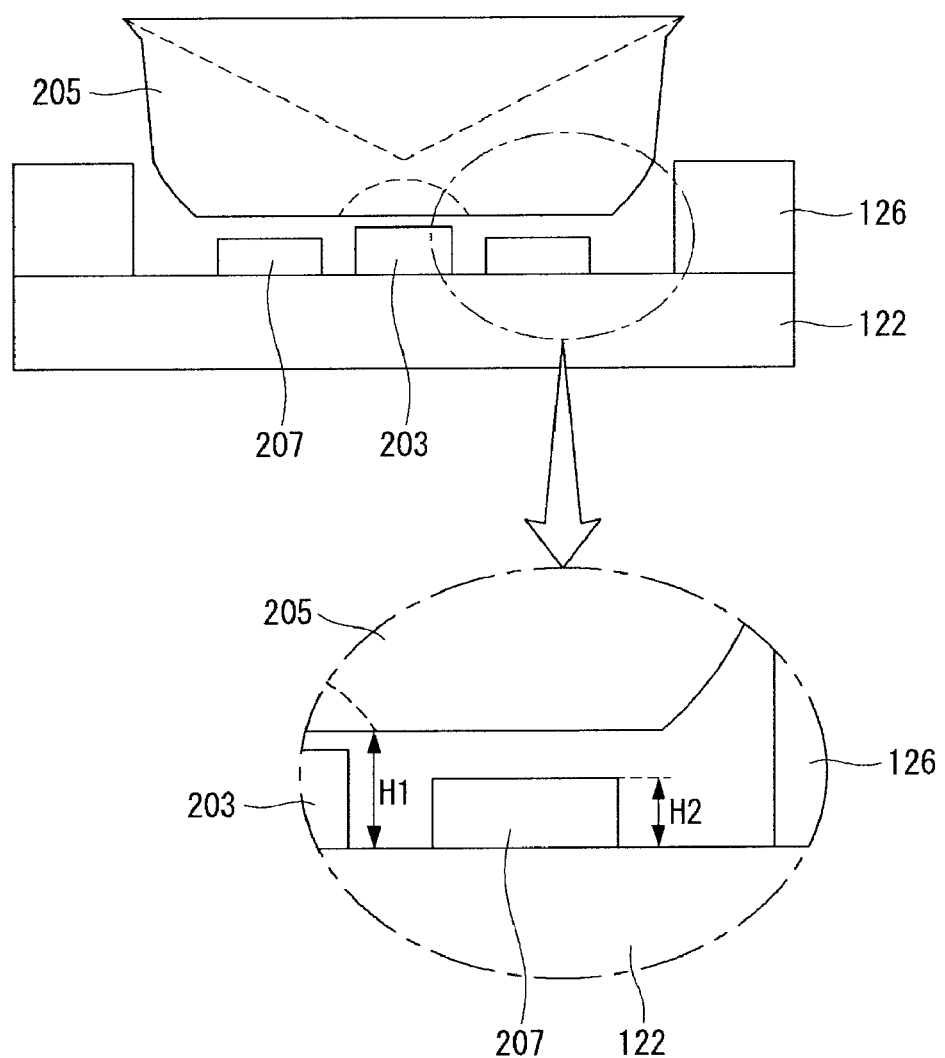

Referring to FIG. 32, the height H2 of the reflection ring 207 may be smaller than the height H1 of the light source 203. The reflection ring 207 may function to block light which leaks from the side of the light source 203. Furthermore, light incident on another part of the light source 203 other than the side of the light source 203 may be dispersed by the reflection of the inside of the lens 205. Accordingly, the height H2 of the reflection ring 207 may be smaller than the height H1 of the light source 203 in order to prevent light which leaks from the side of the light source 203.

The height H2 of the reflection ring 207 may be greater than 40% of the height H1 of the light source 203. The reflection ring 207 may function to prevent light which leaks from the side of the light source 203 and reflect the light. If the height H2 of the reflection ring 207 is smaller than 40% of the height H1 of the light source 203, the reflection ring 207 may not function to prevent light which leaks from the side of the light source 203. Accordingly, the height H2 of the reflection ring 207 may be greater than 40% of the height H1 of the light source 203.

Figure 33:
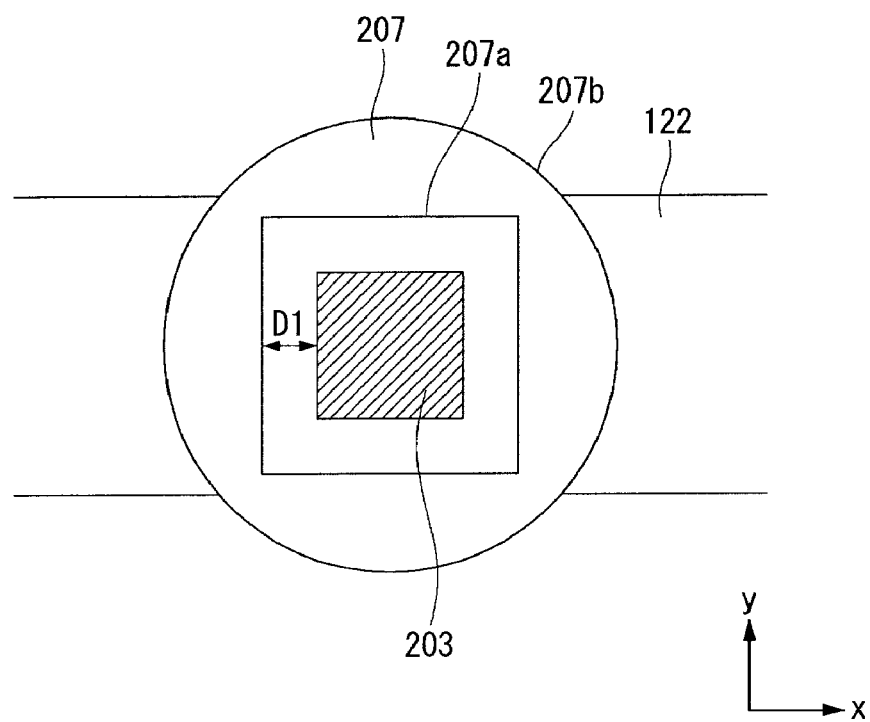

Referring to FIG. 33, the outside 207b of the reflection ring 207 in accordance with an embodiment of the present invention may have a circle. The shape of the inside 207a of the reflection ring 207 may be the same as or similar to that of the light source 203. The shape of the inside 207a of the reflection ring 207 may be the same as or similar to that of the light source 203 in order to maintain a specific interval in the light source 203 and all the locations.

The inside 207a of the reflection ring 207 may be spaced apart from the light source 203 at a specific interval D1. For example, the inside 207a of the reflection ring 207 may be spaced apart from the light source 203 at an interval of 500 micrometers or more to 1 millimeter or less. If the distance between the inside 207a of the reflection ring 207 and the light source 203 is 500 micrometers or more to 1 millimeter or less, the reflection ring 207 may function to prevent light which leaks from the side of the light source 203. If the distance between the inside 207a of the reflection ring 207 and the light source 203 is less than 500 micrometers, the reflection ability of the reflection ring 207 may be reduced. If the distance between the inside 207a of the reflection ring 207 and the light source 203 is more than 1 millimeters, the reflection ability of the reflection ring 207 is unable to prevent leaking light.

Figure 34:
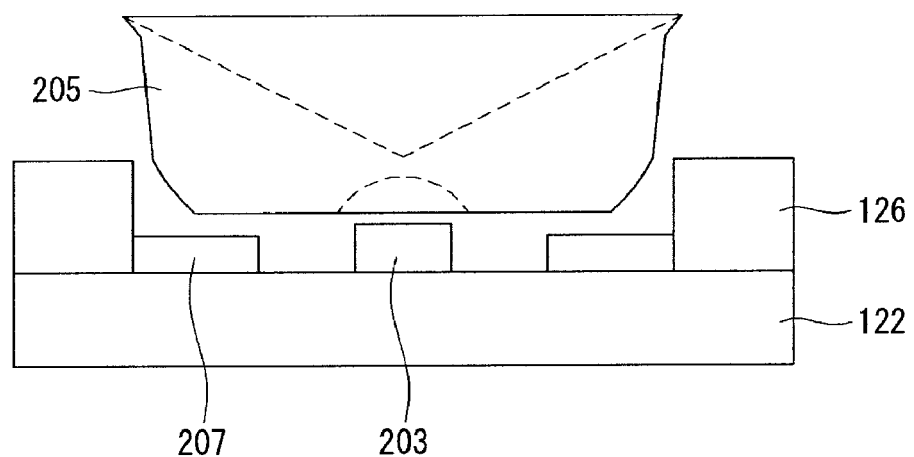

Referring to FIG. 34, the reflection ring 207 and the reflection sheet 126 may come in contact with each other. One side of the reflection ring 207 may be protruded to the outside of the lens 205 because the reflection ring 207 needs to come in contact with the reflection sheet 126.

In the reflection ring 207 in accordance with an embodiment of the present invention, the space between the reflection ring 207 and the reflection sheet 126 can be removed because the reflection ring 207 and the reflection sheet 126 need to come in contact with each other. Accordingly, light can be prevented from being incident on the space between the reflection ring 207 and the reflection sheet 126 and from being absorbed by the substrate 122. Accordingly, light efficiency of the backlight unit can be further improved.

Figure 35:
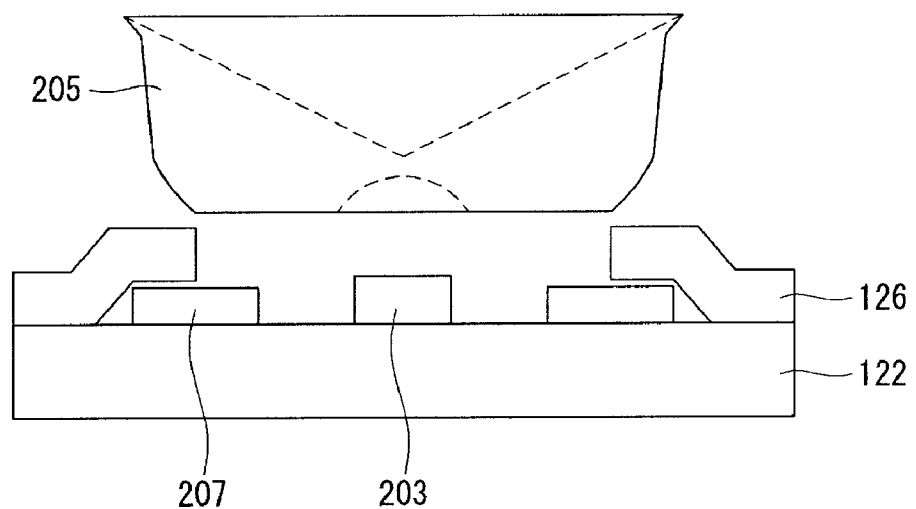

Referring to FIG. 35, the reflection ring 207 and the reflection sheet 126 may overlap with each other. One side of the reflection sheet 126 may be extended on top of the reflection ring 207. Accordingly, one side of the reflection sheet 126 may burrow under the lens 205. Since one side of the reflection sheet 126 is extended on top of the reflection ring 207, height including the reflection ring 207 and the reflection sheet 126 may be higher than the height of the light source 203.

In the reflection ring 207 in accordance with an embodiment of the present invention, light may not leak between the reflection ring 207 and the reflection sheet 126 because the reflection ring 207 and the reflection sheet 126 overlap with each other. Accordingly, light efficiency can be improved because light absorbed by the substrate 122 is reduced.

Figure 36:
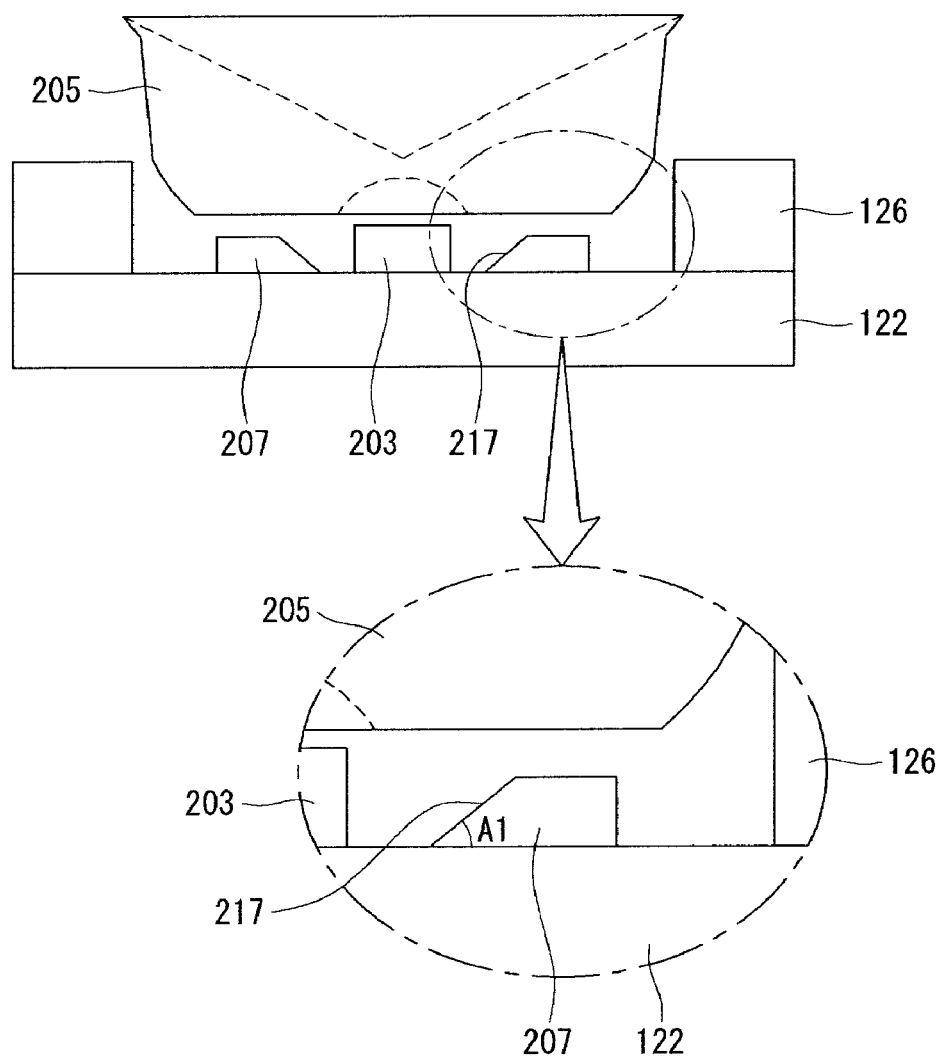
Figure 37:
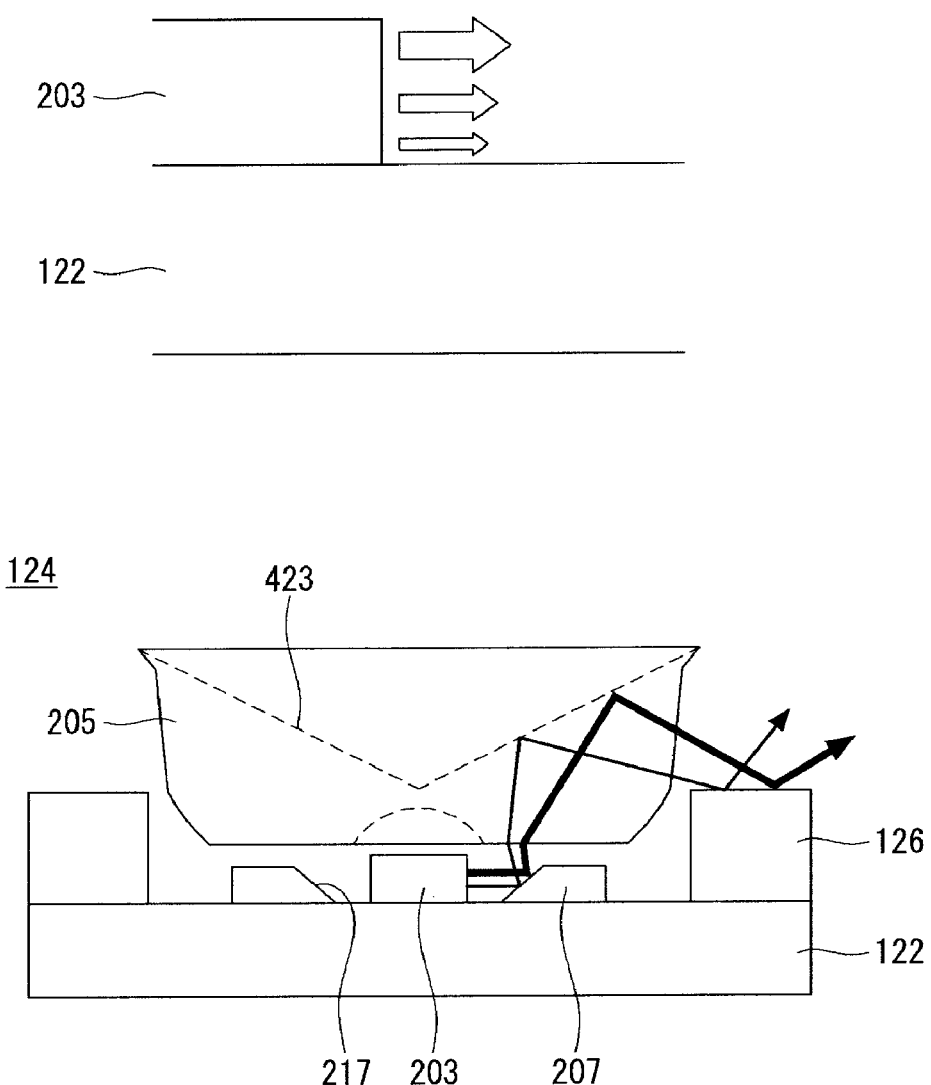

Referring to FIGS. 36 and 37, the face 217 of the reflection sheet 207 which faces the light source 203 may be tilted. Specifically, the angle A1 of the face 217 of the reflection ring 207 which faces the light source 203 may be 60 degrees or more 90 degrees or less from the ground. If the angle A1 of the face 217 of the reflection ring 207 which faces the light source 203 is less than 60 degrees, light leaking from the side of the light source 203 may not be reflected toward the lens 205, but may laterally leak.

The amount of light incident from the side of the light source 203 may be greater than the amount of light incident from the lower side of the light source 203 toward the top. Accordingly, if the first plane 217 of the reflection ring 207 is tilted as described above, light incident from the upper side of the light source 203 may be reflected toward the upper side of the first plane 217 of the reflection ring 207. The reflected light may be totally reflected toward the inverse-conical groove 423 of the lens and then laterally dispersed.

Light incident from the lower side of the light source 203 may be reflected toward the lower side of the face 217 of the reflection sheet 207 which faces the light source 203. The reflected light may be totally reflected toward the inverse-conical groove 423 of the lens and then laterally dispersed. Light incident from the lower side of the light source 203 can be dispersed to a closer portion compared to light incident from the upper side of the light source 203.

In the reflection ring 207 in accordance with an embodiment of the present invention, since the face 217 of the reflection ring 207 which faces the light source 203 is tilted, light which is incident on the upper side of the light source 203 and is great in the amount of light can be dispersed far away. Light which is incident from the lower side of the light source 203 and is small in the amount of light can be dispersed relatively closely.

Figure 38:
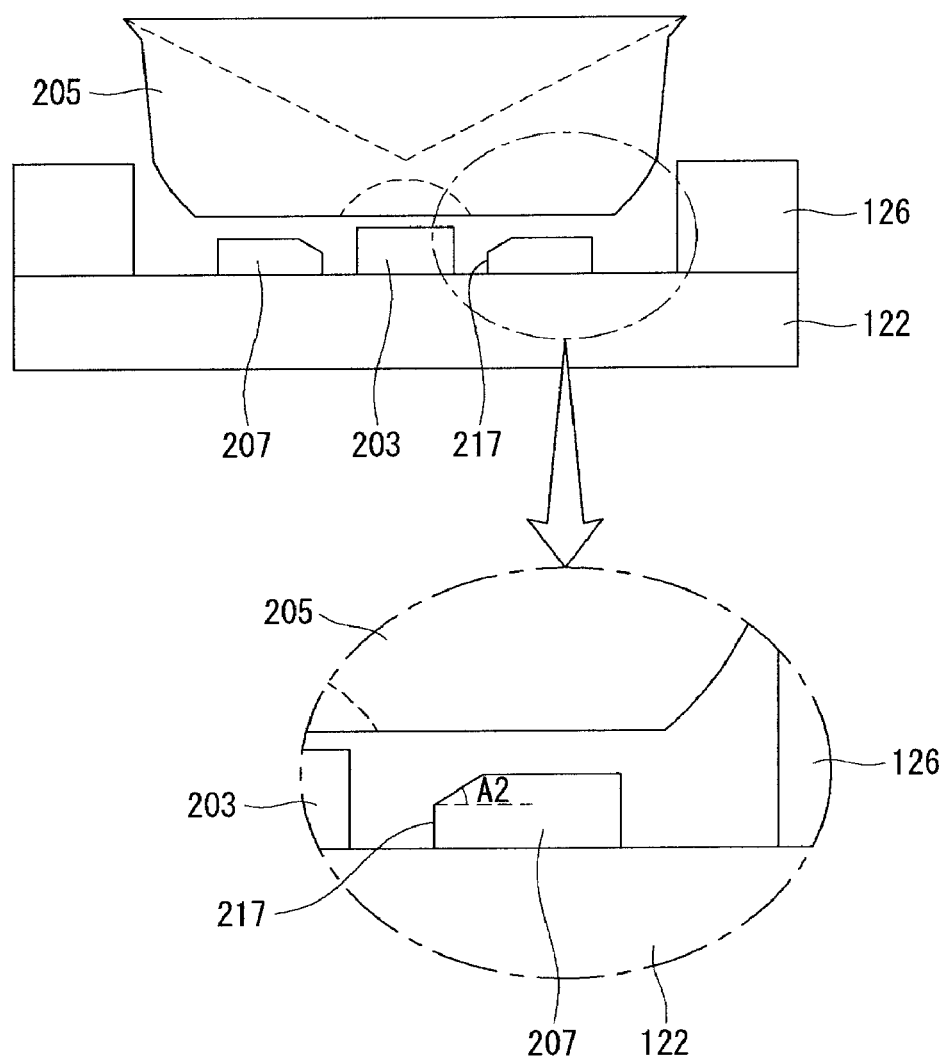

Referring to FIG. 38, the lower side of the first plane 217 of the reflection ring 207 may not be tilted, but only the upper side of the first plane 217 of the reflection ring 207 may be tilted. In other words, the first plane 217 of the reflection ring 207 may include an inclined plane of at least one some region and a vertical plane of at least the other region. The reflection ring 207 may have a trapezoid shape. The angle A2 of the upper side of the first plane 217 of the reflection ring 207 may be 60 degrees or more from the ground. If the angle A2 of the upper side of the first plane 217 of the reflection ring 207 is less than 60 degrees, light leaking from the side of the light source 203 may laterally leak without being reflected toward the lens 205.

In the reflection ring 207 in accordance with an embodiment of the present invention, the lower side of the first plane 217 of the reflection ring 207 may not be tilted, but only the upper side of the first plane 217 of the reflection ring 207 may be tilted. Accordingly, light incident from the upper side of the light source 203 can be dispersed far away, and light incident from the lower side of the light source 203 can be dispersed relatively closely.

Furthermore, since the lower side of the first plane 217 of the reflection ring 207 is not tilted, dispersion according to the amount of light can become more uniform compared to the case where the first plane 217 of the reflection ring 207 is fully tilted.

Figure 39:
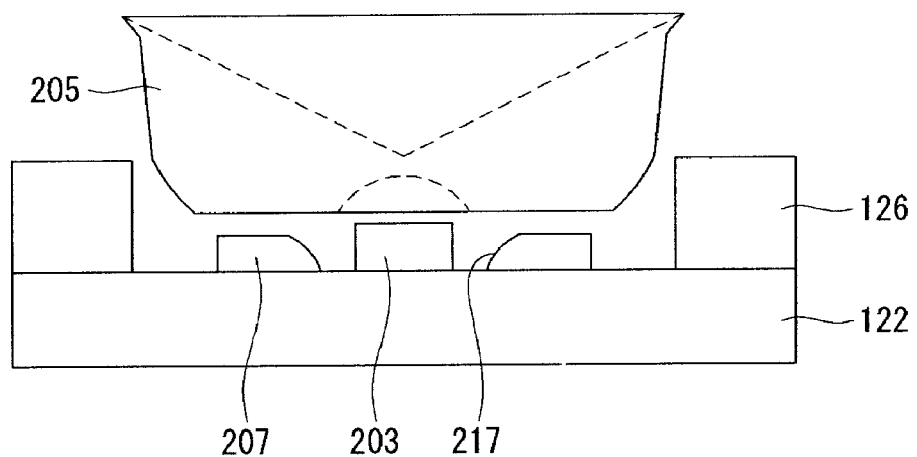

Referring to FIG. 39, the first plane 217 of the reflection ring 207 may be convexly tilted. The angle of the first plane 217 of the reflection ring 207 may be 60 degrees or more 90 degrees or less from the ground in all the contact points. If the angle of the first plane 217 of the reflection ring 207 is less than 60 degrees, light leaking from the side of the light source 203 may laterally leak without being reflected toward the lens 205.

In the reflection ring 207 in accordance with an embodiment of the present invention, since the face 217 of the reflection ring 207 which faces the light source 203 is convexly tilted, light can be better dispersed compared to the case where the face 217 of the reflection ring 207 is tilted at a specific angle.

Figure 40:
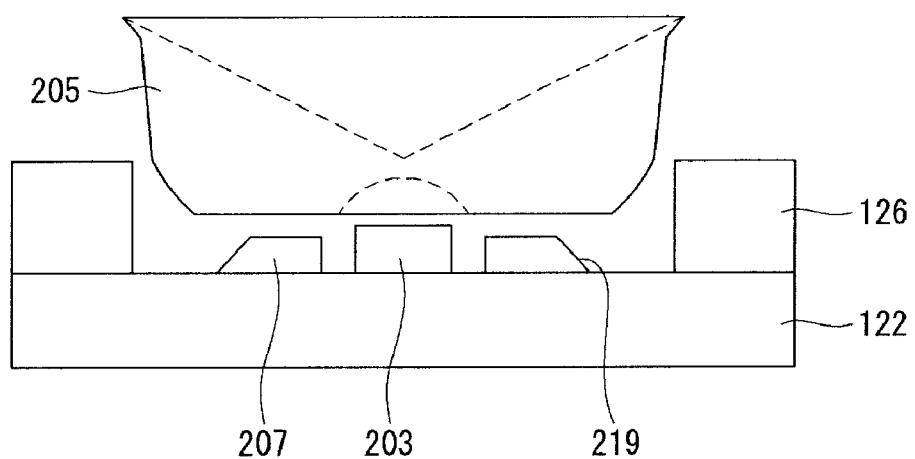
Figure 41:
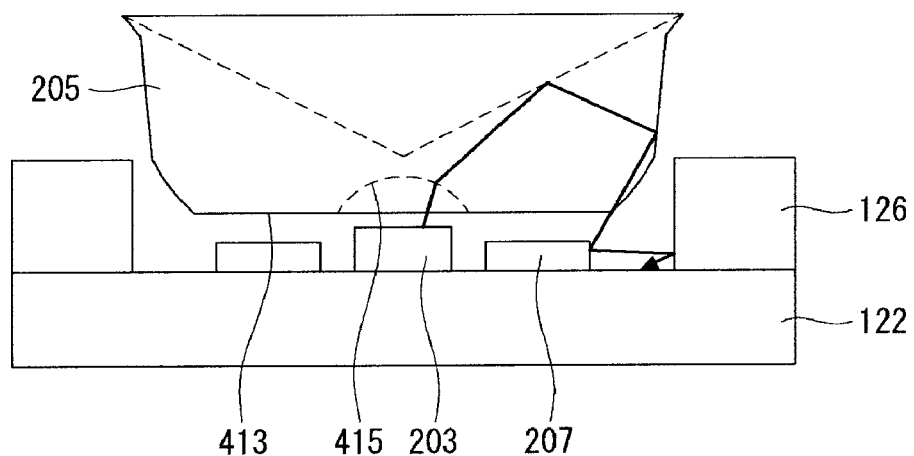
Figure 41:
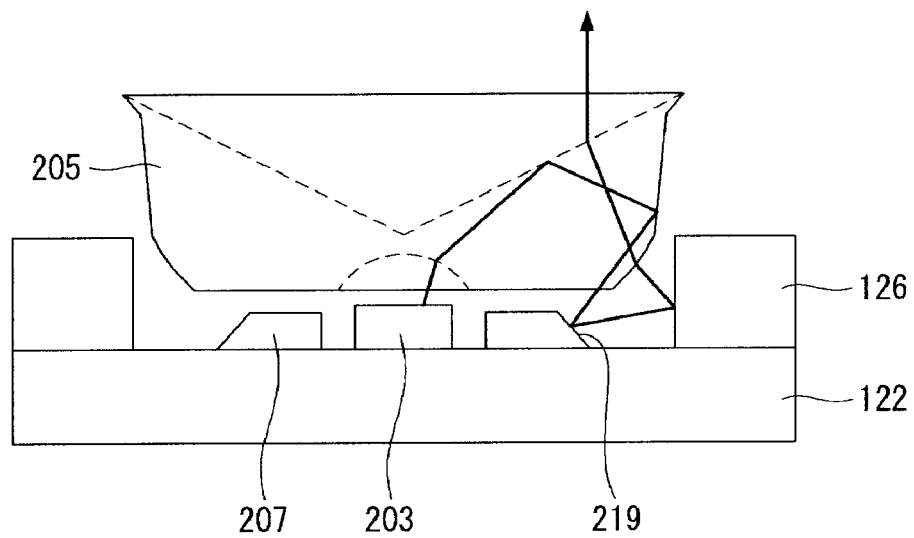

Referring to FIGS. 40 and 41, the second plane 219 of the reflection ring 207 which faces the reflection sheet 126 may be tilted. Specifically, the angle of the second plane 219 of the reflection ring 207 may be 60 degrees or more 90 degrees or less from the ground. If the angle of the second plane 219 of the reflection ring 207 is less than 60 degrees, light reflected by the lens 205 may be absorbed by the substrate 122 without being reflected toward the reflection ring 207.

Light incident on the top of the light source 203 may be curved in the conical groove 415. The curved light may be totally reflected by the inverse-conical groove 423. The light totally reflected by the inverse-conical groove 423 may be reflected by the inverse-conical side part 425. At least some of the reflected light may be incident on the second plane 219 of the reflection ring 207.

If the second plane 219 of the reflection ring 207 is not tilted, light incident on the second plane 219 of the reflection ring 207 may be absorbed by the substrate 122 without being reflected toward the lens 205.

If the second plane 219 of the reflection ring 207 is tilted, light incident on the second plane 219 of the reflection ring 207 may be reflected toward the lens 205 and may travel toward the top of the lens 205.

In the reflection ring 207 in accordance with an embodiment of the present invention, the second plane 219 of the reflection ring 207 can reflect more light toward the lens 205 because the second plane 219 is tilted. Accordingly, light efficiency of the backlight unit can be improved.

Figure 42:
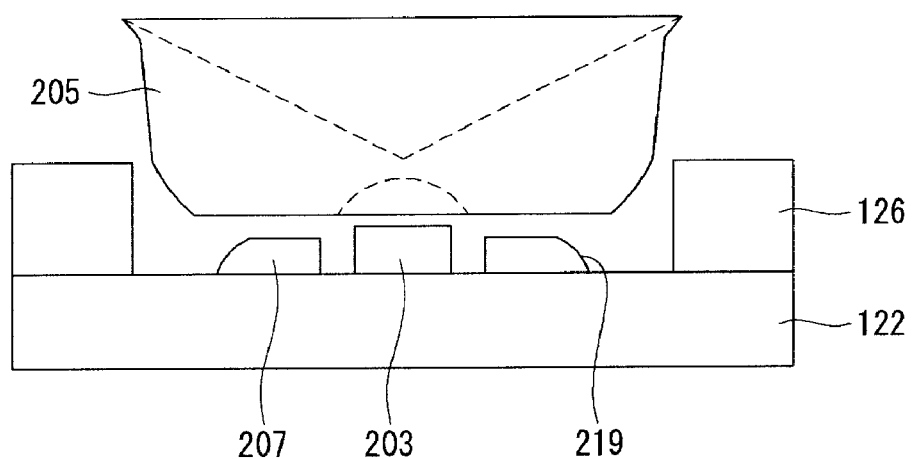

Referring to FIG. 42, the second plane 219 of the reflection ring 207 may be convexly tilted. The angle of the second plane 219 of the reflection ring 207 may be 60 degrees or more 90 degrees or less from the ground in all the contact points. If the angle of the second plane 219 of the reflection ring 207 is less than 60 degrees, light incident on the second plane 219 of the reflection ring 207 may be absorbed by the substrate 122 without being reflected toward the lens 205.

In the reflection ring 207 in accordance with an embodiment of the present invention, since the second plane 219 of the reflection ring 207 is convexly tilted, light can be better dispersed compared to the case where the second plane 219 of the reflection ring 207 is tilted at a specific angle.

Figure 43:
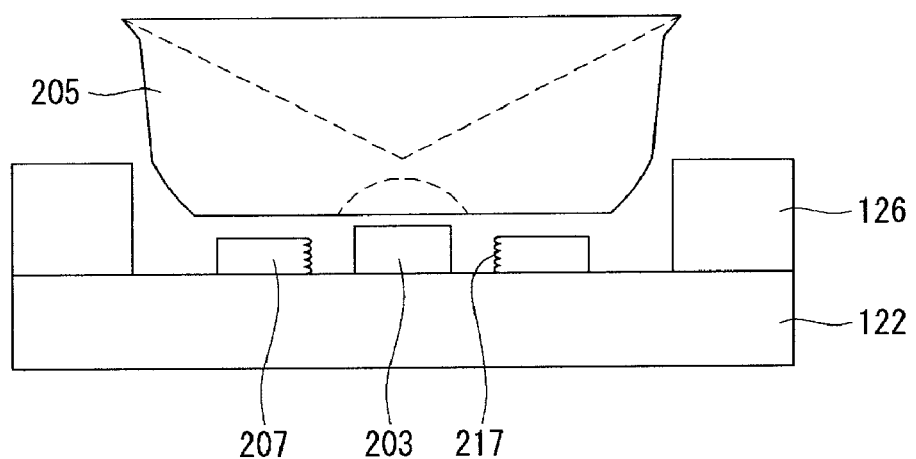

Referring to FIG. 43, the reflection ring 207 may include a plurality of protrusions in the first plane 217. In other words, the first plane 217 of the reflection ring 207 may have at least one convex protrusion.

In the reflection ring 207 in accordance with an embodiment of the present invention, since the first plane 217 of the reflection ring 207 includes at least one convex protrusion, light incident on the side of the light source 203 can be irregularly dispersed in various directions. Accordingly, the backlight unit can have uniform luminance.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

In an aspect of the present invention, there is provided a backlight unit, including a substrate, at least one light source on the substrate, a lenses placed over the light source, a reflection sheet in which at least one through hole corresponding to the lens is formed, and a reflection ring comprising an opening portion corresponding to the at least one light source, and placed between the lens and the substrate.

The reflection ring may be configured to further include a sidewall disposed to face the light source in the opening portion.

Reflectance of the top surface may be greater than reflectance of the substrate.

The thickness of the reflection ring may be different from the thickness of the reflection sheet.

The diameter of the reflection ring may be smaller than the diameter of the lens included in the light assembly.

The opening portion may have any one of a circle, a triangle, and a pentagon.

The backlight unit may further include at least one pattern formed in at least one some region of the top surface.

The backlight unit may further include at least one pattern formed in at least one some region of the at least one sidewall of the reflection ring.

The at least one pattern may include a plurality of regions having different locations, shapes, and colors. The plurality of regions may include a first region and a second region which are repeatedly formed.

The sidewall may include at least one of a first sidewall on the opening portion side in which the light source is placed and a second sidewall outside the reflection ring.

The sidewall may include an inclined plane tilted with respect to the light source.

The sidewall may include an inclined plane of at least one some region and a vertical plane of at least the other region.

The inclined plane may be formed at a tilt angle of 60 degrees or more 90 degrees or less.

The reflection ring may come in contact with the reflection sheet or at least part of the reflection ring may be disposed to overlap with at least part of the reflection sheet.

The distance between the light source and the opening portion may be 500 micrometers or more to 1 millimeter or less.

A ratio of the height of the sidewall to the height of the light source may be 0.4 or higher to 1.0 or less.

In another aspect of the present invention, there is provided a display device, including a backlight unit configured to comprise at least one light source, a display panel placed in the front side of the backlight unit, and a back cover placed in the back side of the backlight unit. The backlight unit comprises a substrate, at least one light source on the substrate, a lens placed over the light source, a reflection sheet in which at least one through hole corresponding to the lens is formed, and a reflection ring comprising an opening portion corresponding to the at least one light source, and placed between the lens and the substrate.

The reflection ring may further include a sidewall disposed to face the light source in the opening portion.

The display device may further include at least one pattern formed in at least one some region of the top surface.

The display device may further include at least one pattern formed in at least one some region of the at least one sidewall of the reflection ring.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a substrate;
   a light source disposed on the substrate;
   a lens disposed over the light source; and
   a plurality of reflective patterns between the substrate and the lens and disposed around the light source,
   wherein each of the plurality of reflective patterns is shaped to be elongated and non-linear and positioned such that a middle portion along a length of each reflective pattern is positioned closer to the light source than corresponding opposite terminating ends along the length of the reflective pattern.

2. The backlight unit of claim 1, wherein each of the plurality of reflective patterns is curvilinear.

3. The backlight unit of claim 2, wherein each of the plurality of reflective patterns has a same shape.

4. The backlight unit of claim 3, wherein the each of the plurality of reflective patterns is yellow and configured to reflect light from the light source toward a bottom surface of the lens.

5. The backlight unit of claim 4, wherein the bottom surface of the lens is curved and comprises a concave groove configured to accommodate the light source therein.

6. The backlight unit of claim 1, further comprising a reflective ring configured to surround the light source and comprising the plurality of reflective patterns.

7. The backlight unit of claim 6, wherein a size of the bottom surface of the lens is larger than a size of the reflective ring such that the lens covers all of the plurality of reflective patterns.

8. The backlight unit of claim 1, further comprising a plurality of supports configured to support the lens disposed over the light source, wherein each of the plurality of reflective patterns is curvilinear and positioned to correspond to one of the plurality of supports.

9. The backlight unit of claim 1, further comprising a plurality of supports coupled to the substrate and configured to support the lens, wherein number of the plurality of supports is the same as a number of the plurality of reflective patterns.

10. The backlight unit of claim 1, wherein the light source is a square or rectangular shape, and wherein each of the plurality of reflective patterns is curvilinear and one or more reflective patterns are positioned such that the middle portion of the reflective pattern is curved toward a corresponding corner of the light source.

11. The backlight unit of claim 1, further comprising a fluorescent layer on top of the light source, and wherein the plurality of reflective patterns is configured to reflect a specific color of light emitted through the fluorescent layer from the light source.

12. The backlight of claim 1, wherein the plurality of reflective patterns is symmetrical with respect to a central axis bisecting the light source.

13. The backlight of claim 1, wherein the lens comprises a concave top surface configured to reflect at least some light from the light source toward lateral sides of the lens.

14. The backlight of claim 1, a height from the substrate to a top of the plurality of patterns is less than a height from the substrate to a top of the light source.

15. A backlight unit comprising:
   a substrate;
   a light source disposed on the substrate;
   a lens disposed over the light source; and
   a plurality of reflective patterns between the substrate and the lens and disposed around the light source,
   wherein each of the plurality of reflective patterns is curvilinear and positioned such that a middle portion along a length of each reflective pattern is curved toward the light source closer than corresponding terminating ends along the length of the reflective pattern,
   wherein each of the plurality of reflective patterns has a same shape, and
   wherein the each of the plurality of reflective patterns is yellow and configured to reflect light from the light source toward a bottom surface of the lens.

16. The backlight unit of claim 15, further comprising a plurality of supports configured to support the lens disposed over the light source, wherein each of the plurality of reflective patterns is curvilinear and positioned to correspond to one of the plurality of supports.

17. The backlight unit of claim 15, further comprising a plurality of supports coupled to the substrate and configured to support the lens, wherein number of the plurality of supports is the same as a number of the plurality of reflective patterns.

* * * * *